(12) United States Patent
Abe

(10) Patent No.: US 7,287,263 B2
(45) Date of Patent: Oct. 23, 2007

(54) DISC APPARATUS

(75) Inventor: Hiroshi Abe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 275 days.

(21) Appl. No.: 10/925,408

(22) Filed: Aug. 25, 2004

(65) Prior Publication Data

US 2005/0050570 A1    Mar. 3, 2005

(30) Foreign Application Priority Data

Aug. 29, 2003  (JP)  ............................. 2003-305596
Aug. 29, 2003  (JP)  ............................. 2003-305607

(51) Int. Cl.
*G11B 7/085*  (2006.01)
*G11B 7/04*  (2006.01)

(52) U.S. Cl. ........................ 720/661; 360/626; 360/624

(58) Field of Classification Search ................ 720/661, 720/626, 624, 703, 659, 663, 665, 664, 673, 720/645, 642, 633, 632, 625, 619, 617, 600
See application file for complete search history.

(56) References Cited

U.S. PATENT DOCUMENTS

| 6,411,582 | B1 | 6/2002 | Nakatani et al. | ............. | 720/620 |
| 6,597,651 | B1 | 7/2003 | Kage et al. | .................. | 720/664 |
| 6,772,426 | B2 | 8/2004 | Akatani | ....................... | 720/624 |
| 7,080,390 | B2 | 7/2006 | Toyama et al. | ............. | 720/659 |
| 2003/0039198 | A1 | 2/2003 | Akatani et al. | ............. | 720/661 |
| 2005/0086672 | A1* | 4/2005 | Shimozaki | .................. | 720/619 |

FOREIGN PATENT DOCUMENTS

| JP | 2000-173205 | 6/2000 |
| JP | 2001-273698 | 10/2001 |
| JP | 2003-059152 | 2/2003 |

OTHER PUBLICATIONS

Office Action dated Jan. 9, 2007 in Japanese Patent Application No. 2003-305596 and Translation.
Office Action dated Jan. 9, 2007 in Japanese Patent Application No. 2003-305607 and Translation.

* cited by examiner

*Primary Examiner*—Julie Anne Watko
(74) *Attorney, Agent, or Firm*—Brinks Hofer Gilson & Lione

(57) ABSTRACT

A disc apparatus includes a casing having an opening for insertion/ejection of a disc, a rotator for clamping and rotating the disc, a disc-transferring member, a head facing a recorded face of the disc and being movable in radial directions of the disc, a rack movable together with the head, a first pinion gear engageable with the rack, a motor for driving the first pinion gear; and a switching member moving between a transmission position and a cut-off position. The switching member connects a power transmission path for transmitting a driving force of the motor to the disc-transferring member when the switching member is in the transmission position, and cuts off the power transmission path when the switching member is in the cut-off position.

18 Claims, 14 Drawing Sheets

DISC APPARATUS

BACKGROUND OF THE INVENTION

1. Field of the Invention

The present invention relates to disc apparatuses in which optical discs such as CDs and DVDs, magnetic optical discs, or magnetic discs are clamped to rotate, and particularly, to a disc apparatus that controls the movement of a head and performs clamping and unclamping of a disc based on a driving force of a common motor.

2. Description of the Related Art

Generally, when a disc is inserted into a casing of an in-vehicle disc apparatus in a stand-by mode, the disc is transferred by, for example, a transfer roller so that the center of the disc is clamped onto a rotator (a turntable). This switches the stand-by mode to a disc-driving mode. In the disc-driving mode, the rotator spins the disc, and a head facing the recorded face of the disc moves parallel to the disc. Thus, the head reads data recorded on the disc, or records data onto the disc.

In a disc apparatus of this type, it is necessary to move a switch slider with the driving force of a motor so as to unclamp the disc from the rotator for stand-by mode or to clamp the disc onto the rotator for disc-driving mode. Moreover, in the stand-by mode, the transfer roller must be driven with a motor that transfers the disc into the casing or ejects the disc out of the casing when the disc is unclamped from the turntable. On the other hand, in the disc-driving mode, it is necessary to drive a sled mechanism with the driving force of a motor to move the head parallel to the recorded face of the disc.

Accordingly, in such a disc apparatus, each mechanism must be driven by a corresponding motor. For this reason, if there are multiple motors installed in the disc apparatus, manufacturing costs and the weight of the apparatus increases. To solve such problems, U.S. Pat. No. 6,411,582 discloses a disc player that drives the mechanisms with a single motor.

The disc player disclosed in U.S. Pat. No. 6,411,582 includes a driving gear (a worm wheel) driven by a motor; and a switch-control idler gear and a roller-actuating idler gear, which are both engaged with the driving gear. Both idler gears are supported by an idler plate. The idler plate is rotatable such that both idler gears are capable of revolving around the driving gear while being engaged with the driving gear.

In the disc-driving mode, the idler plate is locked by an idler-locking plate. Moreover, in the disc-driving mode, the switch-control idler gear engages with a pickup-feeding gear, and the roller-actuating idler gear disengages from a transfer-roller-actuating gear. Consequently, the driving force of the motor moves a pickup parallel to the disc.

When the pickup moves toward the center of the disc, the pickup presses the idler-locking plate such that the idler plate becomes unlocked from the idler-locking plate. Both idler gears thus revolve around the driving gear such that the switch-control idler gear disengages from the pickup-feeding gear and then engages with a switching gear. This drives a shift plate, and the moving force of the shift plate unclamps the disc. Moreover, the roller-actuating idler gear engages with the transfer-roller-actuating gear, thus driving the transfer roller. Consequently, this ejects the unclamped disc out of the disc player.

In conventional disc players, the shift plate is provided with a locking slot. The locking plate and the locking slot regulate the rotational position of the idler plate.

The conventional disc player described above has the following problems:

(1) In the disc-driving mode, the idler-locking plate locks the idler plate so as to maintain the engagement state between the switch-control idler gear and the pickup-feeding gear. For switching from disc-driving mode to stand-by mode, the pickup is moved towards the center of the disc. The moving force of the pickup presses the idler-locking plate towards the inner portion of the disc so that the idler plate becomes unlocked from the idler-locking plate.

However, because the idler-locking plate is biased towards the outer periphery of the disc by a spring, that is, towards the locking direction, the pickup in the stand-by mode constantly presses against the idler-locking plate, namely, against the biasing force of the spring. This implies that if the engagement between the pickup and a leading screw, which applies feeding force to the pickup, becomes loose due to, for example, external vibration, the biasing force of the spring may move the idler-locking plate and the pickup toward the output periphery of the disc. Consequently, this may be problematic due to the fact that the position setting of the idler plate may become different from the intended position in the stand-by mode.

(2) As described previously, the shift plate is provided with the locking slot, and the locking plate and the locking slot regulate the rotational position of the idler plate. In other words, the locking slot restricts the idler plate from rotating to maintain the engagement state between the switch-control idler gear and the switching gear, and between the roller-actuating idler gear and the transfer-roller-actuating gear. Furthermore, when the shift plate is moved and the idler plate becomes free of the restriction of rotation, the idler plate rotates and the switching gear engages with the pickup-feeding gear. Thus, in this state, the locking plate locks the idler plate.

Accordingly, this may be problematic in view of the fact that the disc player requires a large number of components because the positioning of the idler gears is regulated by both the locking slot and the locking plate of the shift plate. Moreover, if the movement of one of the shift plate and the locking plate is slower than the other to cause a time lag, it may cause difficulties in switching between the two modes.

(3) In the conventional disc player described above, the roller-actuating idler gear is constantly engaged with the transfer-roller-actuating gear when the switch-control idler gear is engaged with the switching gear. This means that, after the central hole of the disc is aligned with the rotator, the transfer roller continues to rotate until the shift plate moves and the clamping of the disc is completed. It is thus possible that the rotating transfer roller could damage the disc in this time period.

(4) As described previously, the idler plate supports both the switch-control idler gear and the roller-actuating idler gear. A driving force is applied to the idler plate and each of the idler gears so that both idler gears revolve around the rotating driving gear. This requires a great amount of power because a large amount of driving force is required for rotating the driving gear and the motor must thus be driven continuously.

SUMMARY OF THE INVENTION

Accordingly, it is an object of the present invention to solve the problems described above by providing a disc apparatus that ensures a proper switching operation between different power transmission paths of a motor, and reduces the amount of driving force required in the motor.

According to an embodiment of the present invention, a disc apparatus is provided. The disc apparatus includes a casing having an opening through which a disc is inserted or ejected; a rotator to which the disc is clamped, the rotator rotating the disc; a disc-transferring member for transferring the disc between the opening and the rotator; a head facing a recorded face of the disc clamped to the rotator, the head being movable toward and away from the center of the disc; a rack that is movable together with the head, the rack being provided with gear teeth; a first pinion gear that is engageable with the gear teeth of the rack; a motor for driving the first pinion gear; and a switching member that moves between a transmission position and a cut-off position. The switching member connects a power transmission path for transmitting a driving force of the motor to the disc-transferring member when the switching member is in the transmission position, and cuts off the power transmission path when the switching member is in the cut-off position. When the rack moves towards the inner portion of the disc in a state where the disc is not clamped to the rotator, a moving force of the rack allows the switching member to move from the cut-off position to the transmission position such that the driving force of the motor is transmitted to the disc-transferring member.

Furthermore, the disc apparatus is preferably provided with a detector for determining whether the disc is transferred to a predetermined position in the casing. When the detector determines that the disc is transferred to the predetermined position while the driving force of the motor is being transmitted to the disc-transferring member via the power transmission path, the driving force of the motor transmitted through the power transmission path allows the disc to be clamped to the rotator.

Accordingly, because the moving force of the rack moves the switching member to connect the power transmission path, a proper setting of the power transmission path in the stand-by mode can be easily obtained.

Furthermore, the disc apparatus is preferably provided with a biasing member between the head and the rack. The biasing member biases the rack towards the outer periphery of the disc. When the switching member starts moving towards the transmission position in response to the movement of the rack towards the inner portion of the disc for connecting the power transmission path, the switching member forces the rack to move against the biasing force of the biasing member such that the rack is pulled towards the inner portion of the disc. Thus, the gear teeth of the rack become disengaged from the first pinion gear.

Accordingly, because the moving force of the switching member cuts off the power transmission between the pinion gear and the rack, a designated planet gear for connecting or cutting off the power transmission path to a pickup-feeding mechanism is not necessary. This reduces the number of required components as well as reducing the driving force required in the motor.

The switching member may further include a sun gear driven by the motor, and a planet gear engaged with the sun gear. In this case, when the switching member moves toward the transmission position, the planet gear engages with a first intermediate gear so as to connect the power transmission path. In contrast, when the switching member moves toward the cut-off position, the planet gear disengages from the first intermediate gear so as to cut off the power transmission path. The movement of the switching member towards the transmission position for engaging the planet gear with the first intermediate gear allows the rack to be pulled toward the inner portion of the disc.

In such a case, the disc apparatus is preferably provided with an intermediate member that is engageable with the planet gear. The switching member may be moved from the cut-off position to the transmission position based on a rotational force of the planet gear generated when the planet gear is engaged with the intermediate member.

Accordingly, because the switching member is moved to the transmission position by utilizing the rotational force of the planet gear, the gear teeth of the rack can be properly disengaged from the first pinion gear.

Furthermore, the disc apparatus is preferably provided with a switch slider that moves between a first position and a second position, the first position corresponding to unclamping of the disc from the rotator, the second position corresponding to clamping of the disc to the rotator; and a restraining member that moves between a restraining position for restraining the switching member in the transmission position and a restraint-free position for releasing the switching member from the restraining position. The switch slider includes a restriction segment for maintaining the restraining member in the restraining position when the switch slider is in the first position or when the switch slider moves from the first position to the second position. The restriction segment allows the restraining member to move to the restraint-free position when the switch slider is shifted to the second position.

Accordingly, this minimizes the number of required components and ensures a proper switching operation between the stand-by mode and the disc-driving mode because the restriction segment of the switch slider restricts the position of the restraining member so as to regulate the position of the switching member, i.e. the position of the planet gear.

In this case, the power transmission path preferably includes a third intermediate gear for transmitting the driving force of the motor to the disc-transferring member, and a switching gear that is movable between an engagement position with the third intermediate gear and a disengagement position from the third intermediate gear. The switch slider may further include a transmission cam. The transmission cam allows the switching gear to engage with the third intermediate gear when the switch slider is in the first position so as to connect the power transmission path for transmitting the driving force of the motor to the disc-transferring member. On the other hand, the transmission cam allows the switching gear to disengage from the third intermediate gear when the switch slider is shifted from the first position to the second position to cut off the power transmission path.

Because the transmission cam of the switch slider controls the power transmission to the disc-transferring member, the power transmission path to the disc-transferring member can be cut off just when the central hole of the disc is aligned with the rotator or just after the alignment of the two, that is, before the completion of the clamping of the disc. Consequently, this prevents damaging of the disc caused when the disc-transferring member continues rotating.

Furthermore, the disc apparatus is preferably provided with an engagement member that is movable together with the switch slider between the first position and the second position, the engagement member being movable by a relative distance with respect to the switch slider; a detector that is moved by being pressed by the disc when the disc is transferred to a predetermined position in the casing; and a second pinion gear that is driven by the motor via the sun gear and the planet gear when the switching member is in the transmission position. The engagement member may be provided with a first rack and the switch slider may be provided with a second rack. When the engagement member and the switch slider are in the first position and the detector is moved by being pressed by the disc, the detector forces the engagement member to move toward the second position so that the first rack of the engagement member engages with the second pinion gear. Thus, the rotational force of the second pinion gear forces the engagement member to move further such that the switch slider is moved to the second position.

Accordingly, this achieves high-precision setting for the timing of the switch slider moving in response to the detection of disc insertion.

Furthermore, the disc apparatus is preferably provided with a transmission member disposed between the rack and the switching member. The transmission member transmits the moving force of the rack moving towards the inner portion of the disc to the switching member so as to move the switching member towards the transmission position.

The transmission member ensures the transmission of the moving force of the rack to the switching member. Moreover, the moving force of the switching member ensures the rack to be pulled so that the gear teeth of the rack can be disengaged from the first pinion gear.

Furthermore, the switching member may be provided with a switching cam that engages with the transmission member. The switching cam restricts the movement of the transmission member when the switching member is in the transmission position so as to maintain the pulled state of the rack toward the inner portion of the disc and the disengaged state between the gear teeth of the rack and the first pinion gear.

Accordingly, when the switching member is moving towards the transmission position, the disengagement state between the gear teeth of the rack and the first pinion gear can be maintained.

According to the present invention, a disc apparatus that is capable of driving a disc-transferring member and a head with a driving force of a single motor is provided. The disc apparatus of the present invention has a simple structure and ensures the switching operation between different power transmission paths of the motor.

DESCRIPTION OF THE PREFERRED EMBODIMENTS

Figure 1:
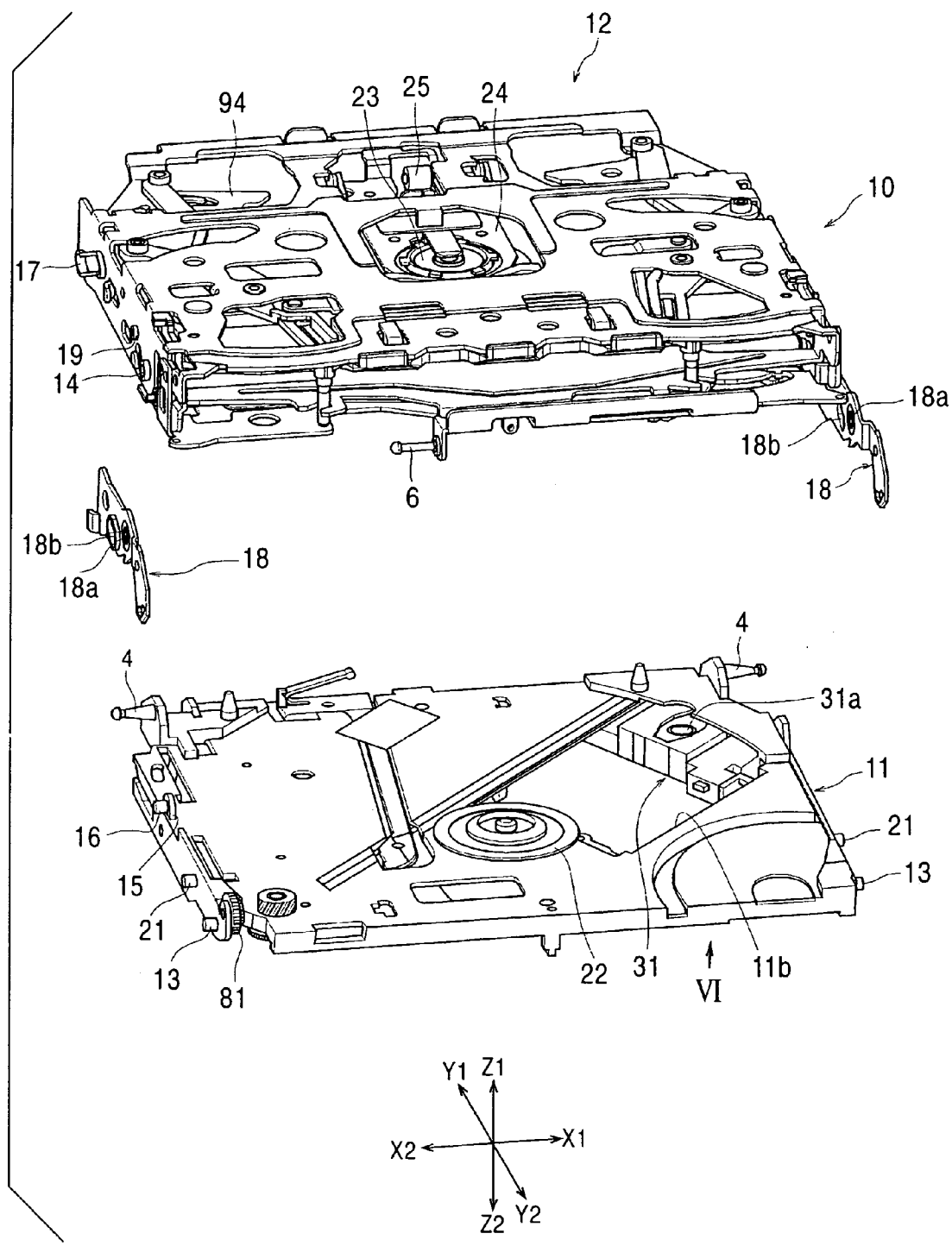
FIG. 1 is an exploded perspective view of a driving device included in a disc apparatus according to a first embodiment of the present invention.
Figure 2:
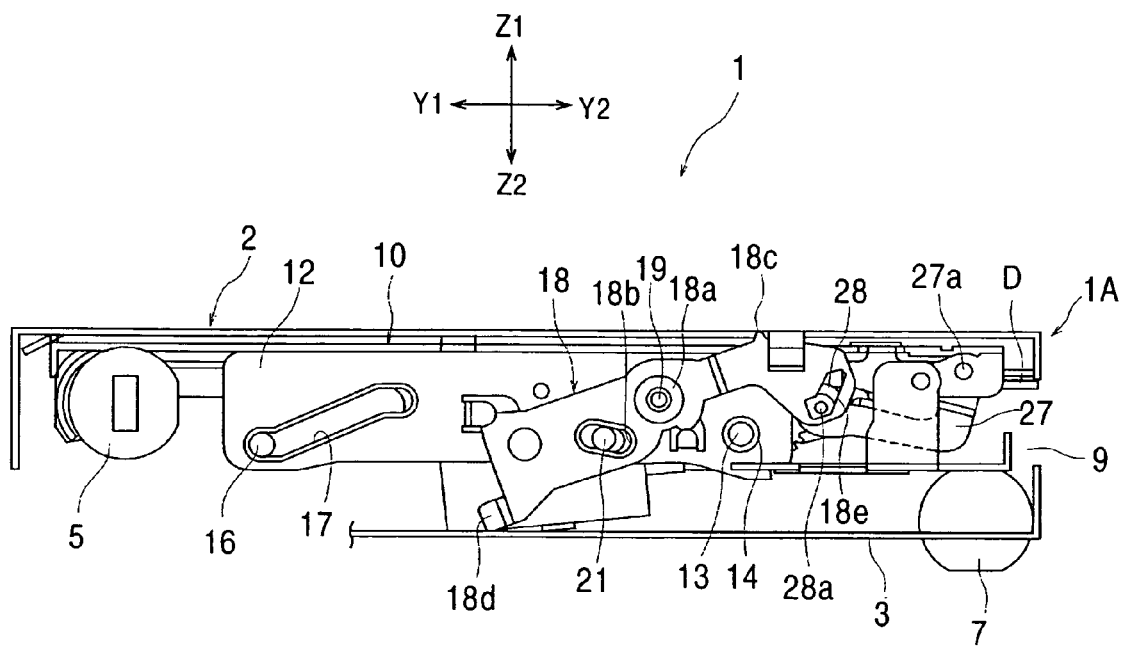
FIG. 2 is a side view of the disc apparatus in a stand-by mode for disc insertion.
Figure 3:
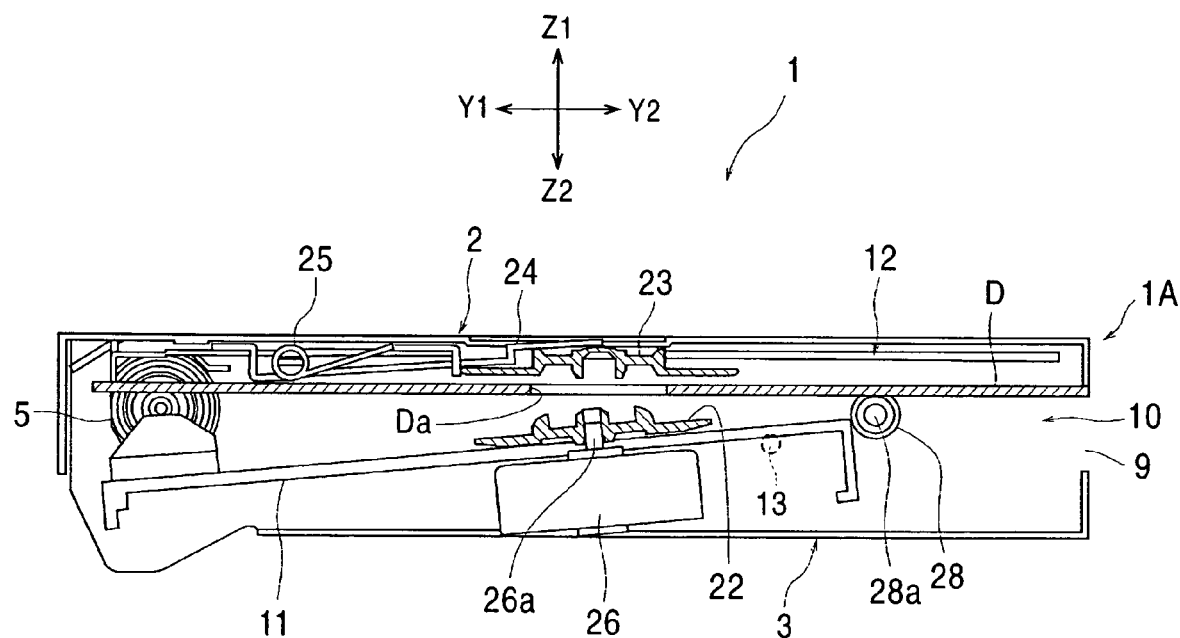
FIG. 3 is a cross-sectional view of the disc apparatus in the stand-by mode.
Figure 4:
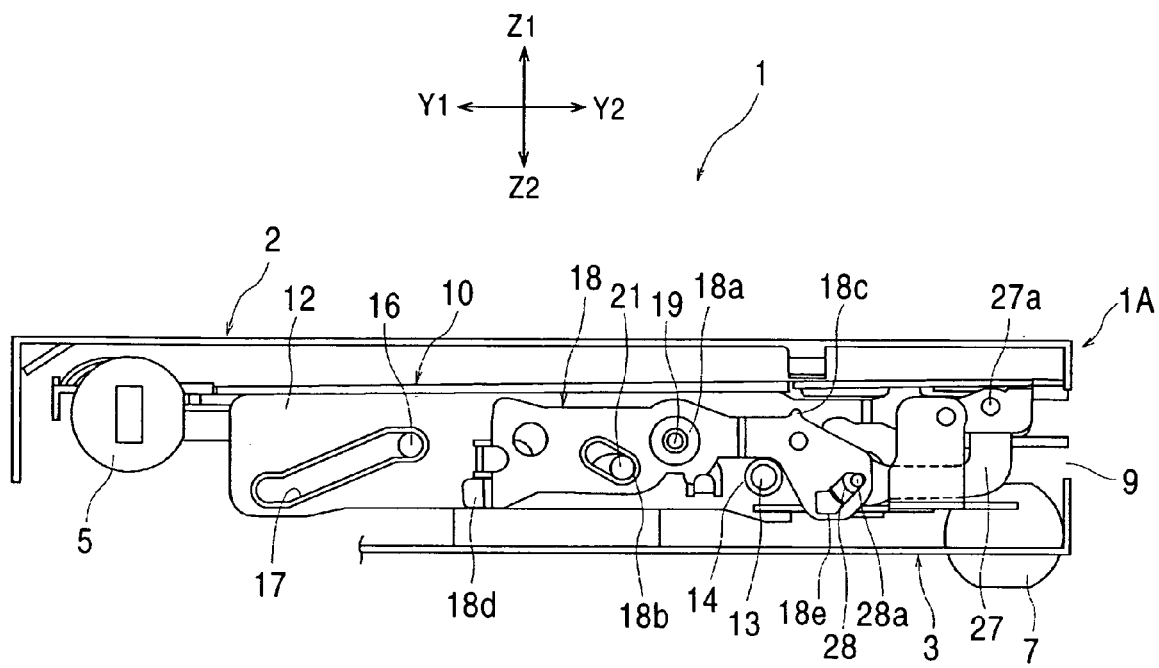
FIG. 4 is a side view of the disc apparatus in a disc-driving mode.
Figure 5:
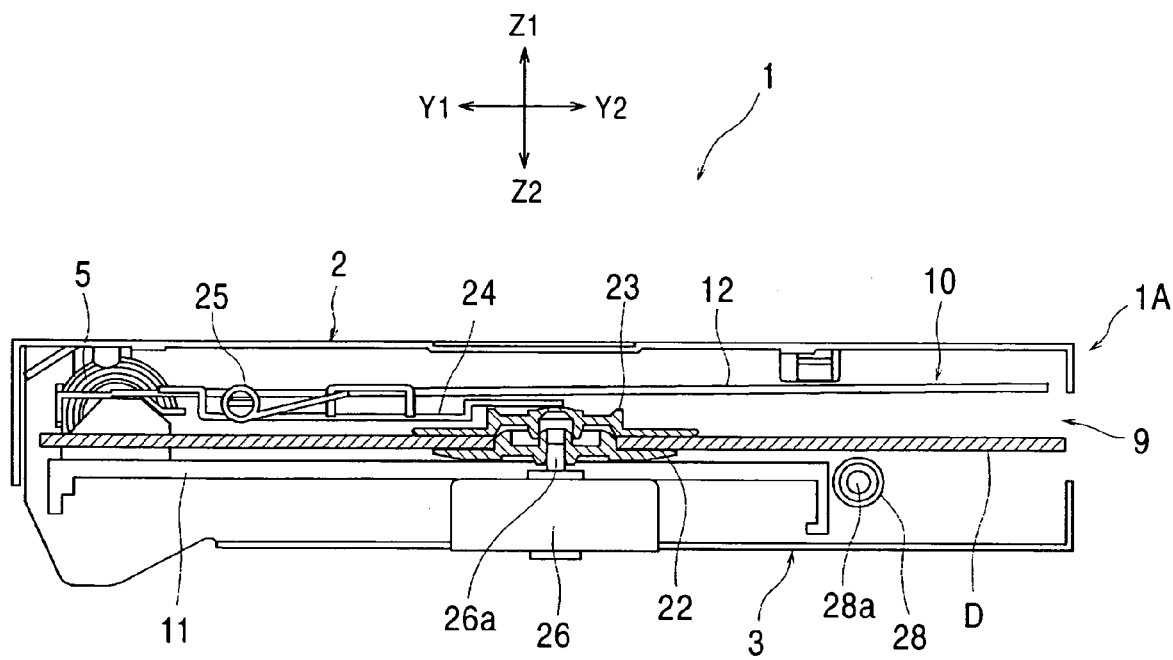
FIG. 5 is a cross-sectional view of the disc apparatus in the disc-driving mode.

FIGS. 1 to 12 illustrate a disc apparatus 1 according to a first embodiment of the present invention. In detail, FIG. 1 is an exploded perspective view of a driving device 10 included in the disc apparatus 1. FIGS. 2 to 5 each illustrate a state where the driving device 10 is housed inside an external casing 1A. Specifically, FIGS. 2 and 4 are side views, and FIGS. 3 and 5 are cross-sectional views.

Figure 8:
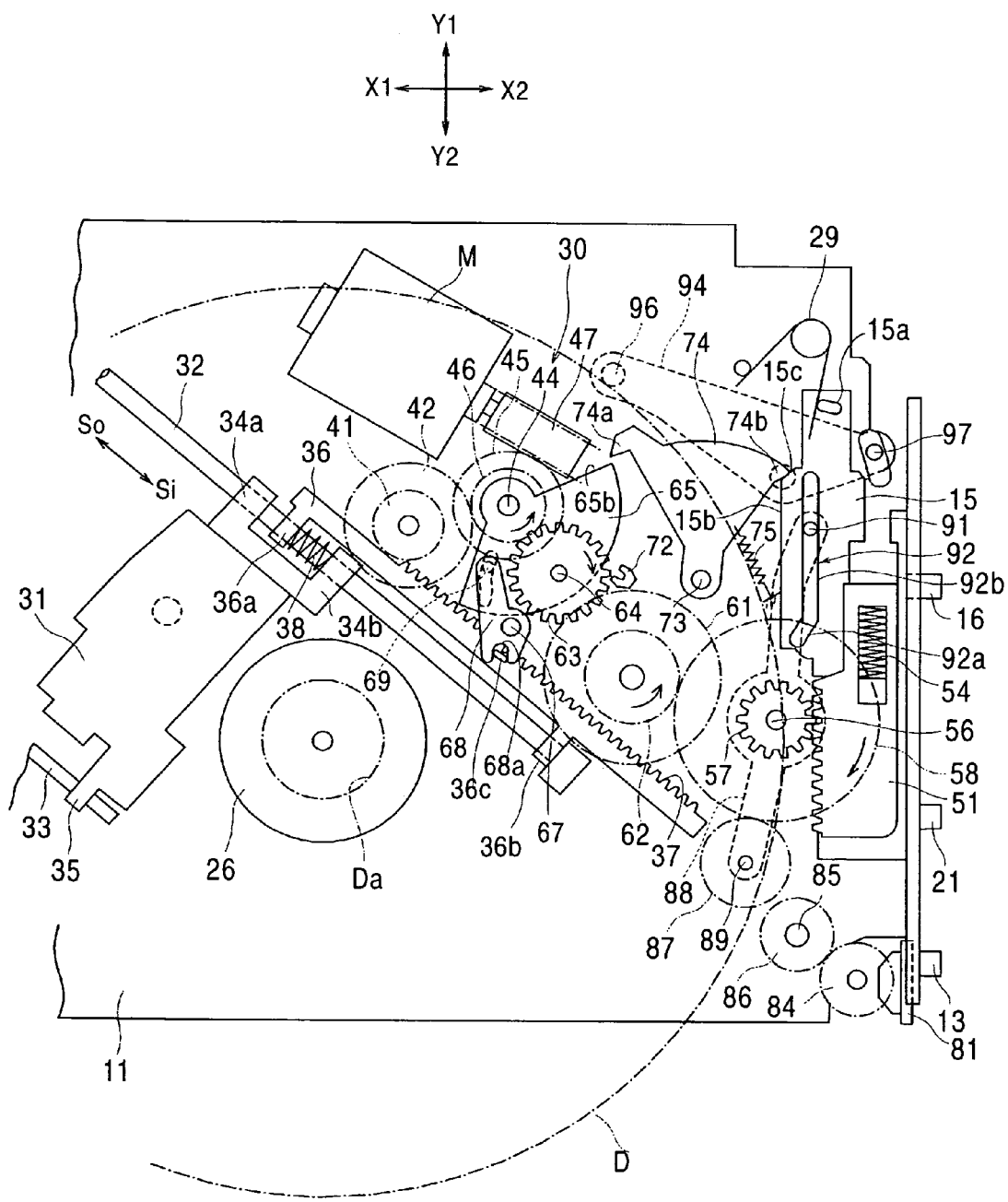
FIG. 8 is another bottom plan view of the lower chassis of the driving device in a state where the stand-by mode is being switched to the disc-driving mode.
Figure 9:
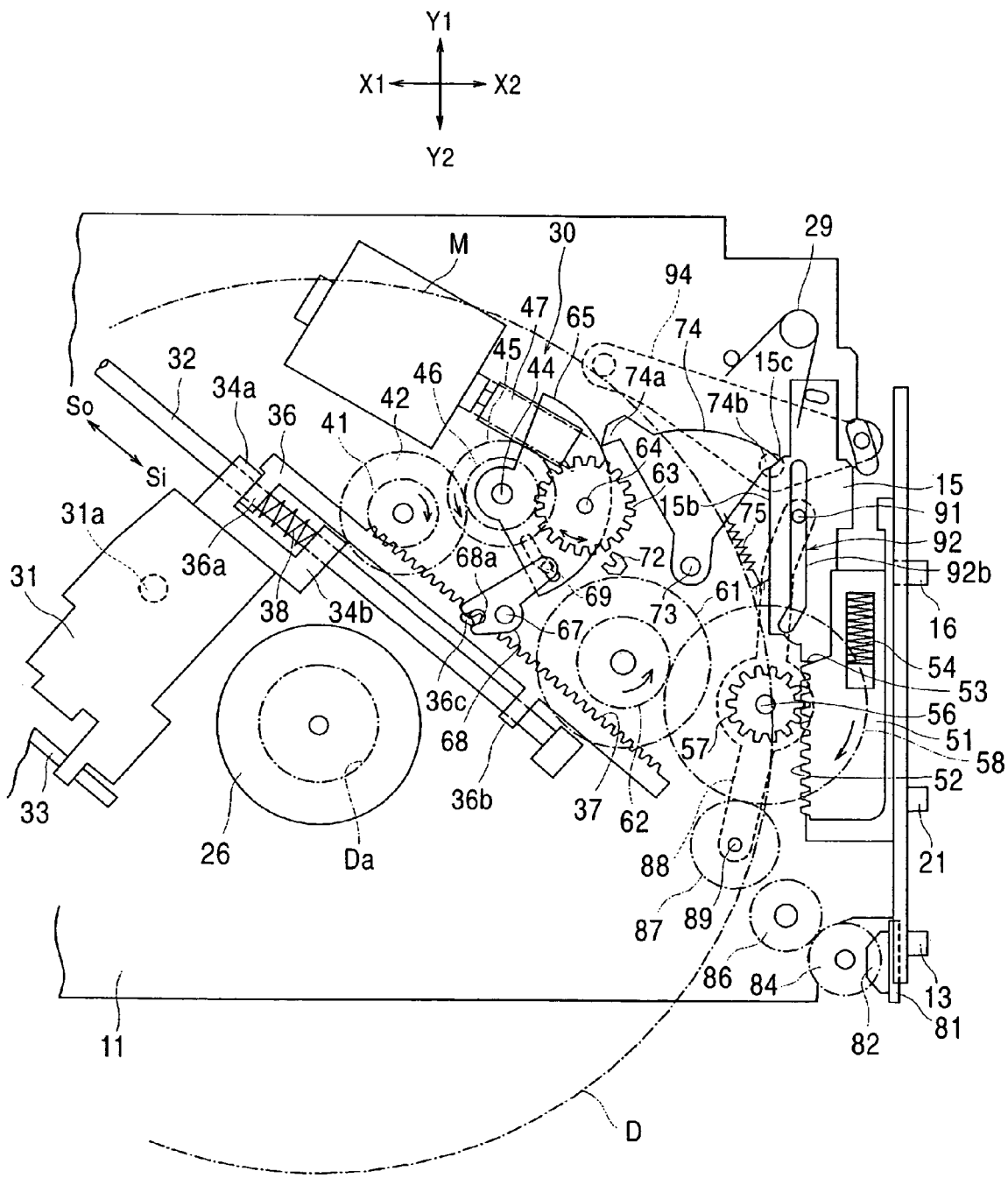
FIG. 9 is another bottom plan view of the lower chassis of the driving device in the disc-driving mode.
Figure 10:
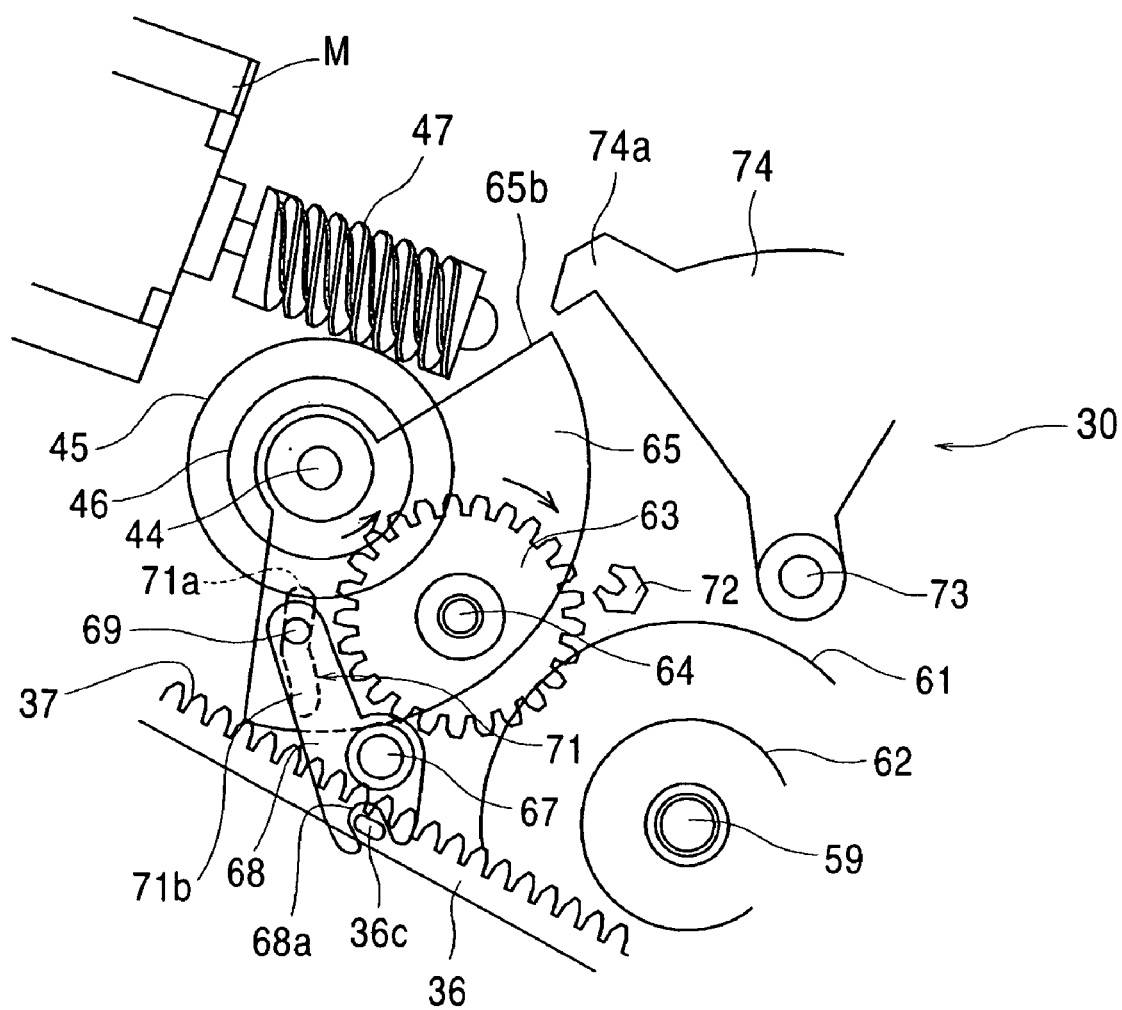
FIG. 10 is a partially-enlarged view of FIG. 6.
Figure 11:
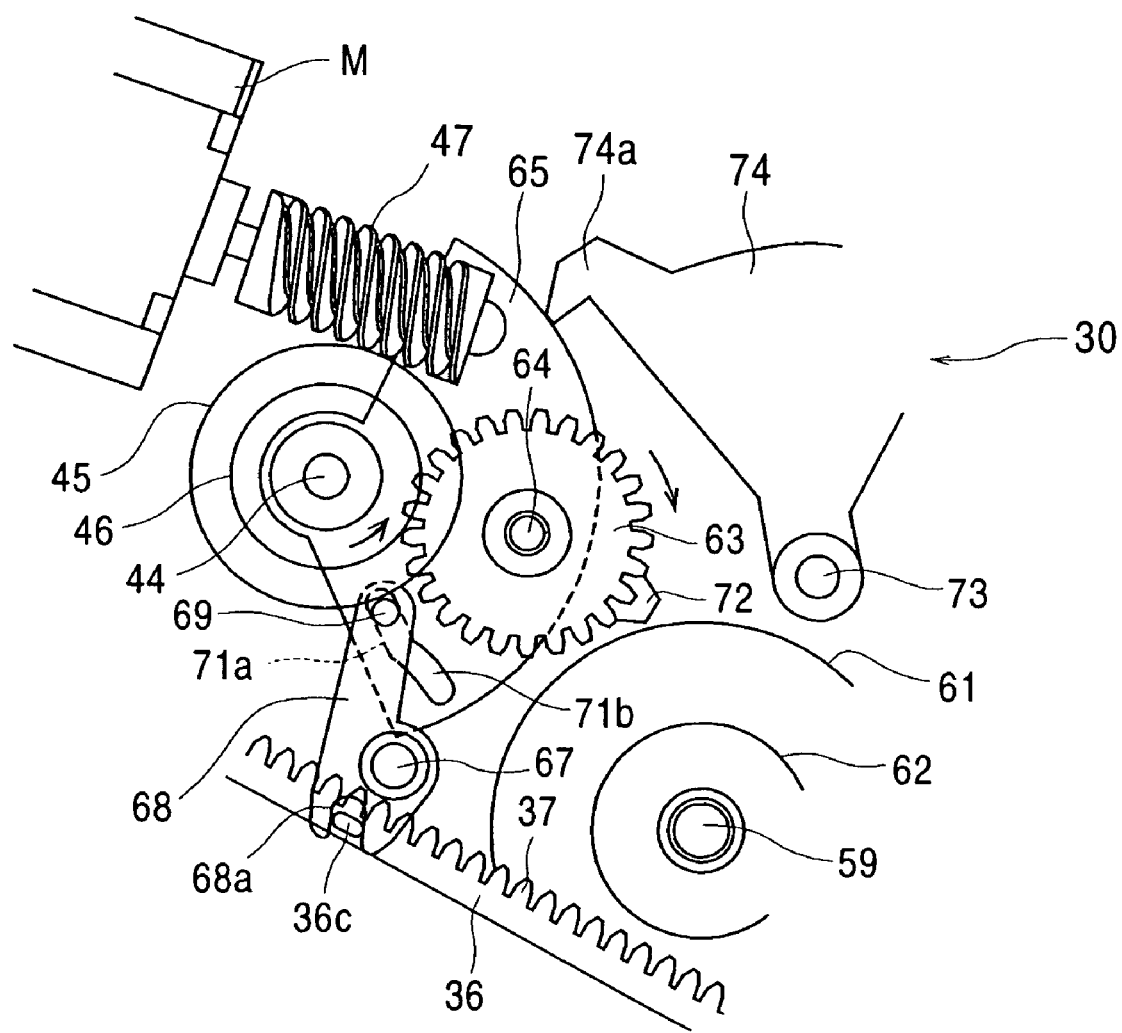
FIG. 11 is a partially-enlarged view illustrating a switching process from the stand-by mode to the disc-driving mode.
Figure 12:
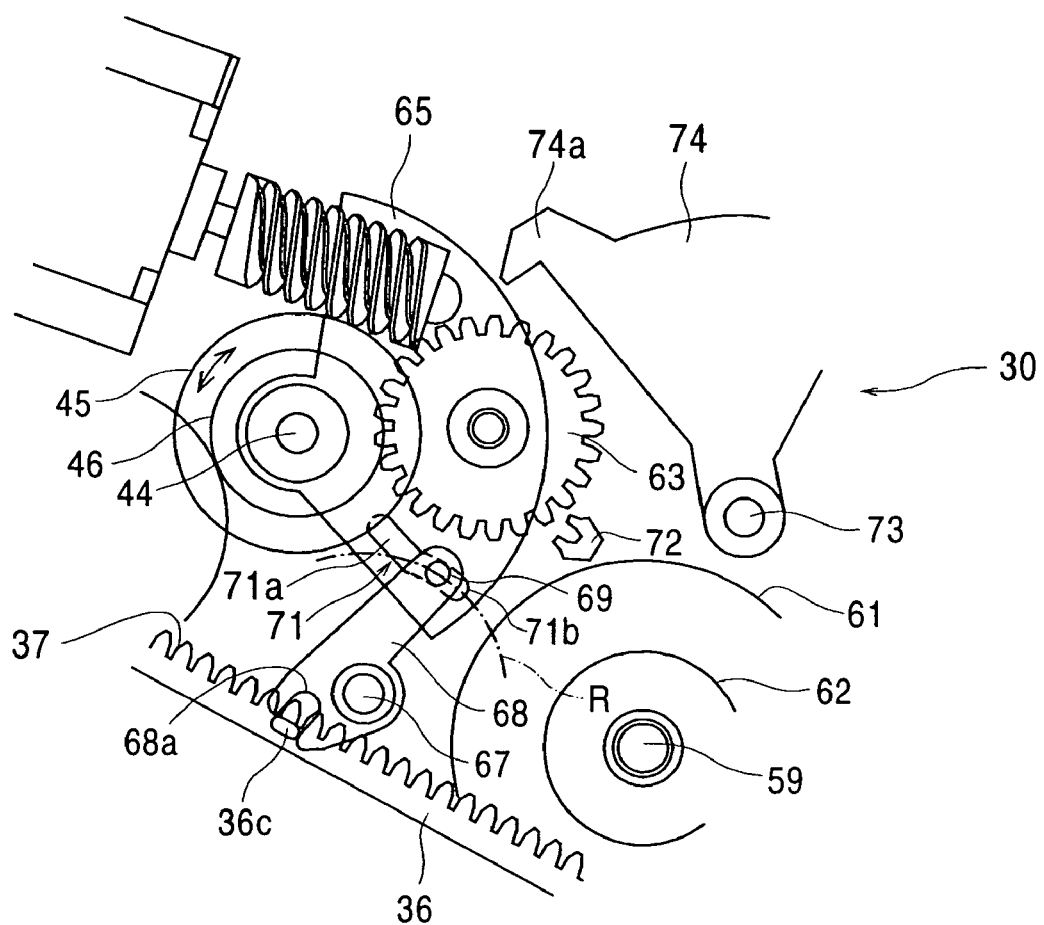
FIG. 12 is a partially-enlarged view of FIG. 9.

FIGS. 6 to 9 illustrate different operational states of a mode-switching unit 30 provided in the driving device 10. Specifically, FIGS. 6 to 9 are bottom plan views of a lower chassis 11 viewed from a direction indicated by an arrow VI in FIG. 1. Furthermore, FIGS. 10 to 12 are partially-enlarged views of FIGS. 6 to 9.

Referring to FIG. 2, the disc apparatus 1 is an in-vehicle apparatus, and includes an upper cover 2 and a lower cover 3, which are assembled together into a box shape to form the external casing 1A. A side of the external casing 1A adjacent to a direction Y2 in the drawings is the front surface of the external casing 1A, and this front surface is provided with an opening 9 through which a disc D is inserted or ejected.

As mentioned above, the driving device 10 is housed inside the external casing 1A. Referring to FIG. 1, the driving device 10 includes the lower chassis 11 and an upper chassis 12.

Referring to FIGS. 1 and 3, the lower chassis 11 is provided with a turntable (a rotator) 22. A spindle motor 26 is fixed to the undersurface of the lower chassis 11, and a driving shaft 26a protrudes upward and extends through the lower chassis 11. The turntable 22 is fixed to the driving shaft 26a.

The upper chassis 12 is provided with a clamper 23. The clamper 23 is rotatably supported by a first end portion of a clamping arm 24 adjacent to the direction Y2. A second end portion of the clamping arm 24 adjacent to a direction Y1 is tiltably supported by the upper chassis 12. Referring to FIG. 3, the clamping arm 24 is constantly biased in the clockwise direction by a spring 25, that is, a direction in which the clamper 23 is lowered.

Referring to FIG. 1, the lower chassis 11 has a pair of supporting pins 4 fixed to two respective corners of the lower chassis 11 adjacent to the direction Y1. Referring to FIG. 2, a damper 5 is fixed to the upper cover 2, and the two supporting pins 4 are resiliently supported by the damper 5. Furthermore, referring to FIG. 1, a supporting pin 6 is fixed to a side of the upper chassis 12 adjacent to the direction Y2. The supporting pin 6 is resiliently supported by a damper 7, which is fixed to the upper cover 2, as shown in FIG. 2.

The dampers 5 and 7 are flexible bags formed of, for example, rubber, and these bags contain fluid, such as oil. When a disc is being driven, the dampers 5 and 7 resiliently support the driving device 10 so as to prevent sound skipping. Specifically, even if the disc apparatus 1 receives external vibration caused by, for example, vibration of a vehicle, the dampers 5 and 7 prevent the vibration from being directly transmitted to the disc being driven.

Referring to FIG. 1, the lower chassis 11 is further provided with a pair of connection shafts 13 fixed to two corresponding corners of the lower chassis 11 adjacent to the direction Y2. The two connection shafts 13 are tiltably engaged with two connection holes 14 provided at two corresponding sides of the upper chassis 12. Consequently, referring to FIGS. 2 to 5, the connection shafts 13 function as a fulcrum for tilting the lower chassis 11 with respect to the upper chassis 12. Because the connection shafts 13 are disposed closer to the front surface of the lower chassis 11 (adjacent to the direction Y2), the lower chassis 11 is capable of being tilted such that the front portion of the lower chassis 11 acts as a fulcrum for tilting the rear portion vertically.

Referring to FIG. 1, a switch slider 15 is provided on a side of the lower chassis 11 adjacent to a direction X2. The switch slider 15 is linearly slidable in the direction Y1 and the direction Y2, and has a switch shaft 16 fixed thereto. Referring to FIGS. 1, 2, and 4, the upper chassis 12 is provided with a slanted opening 17 that extends downward at an angle towards the back of the upper chassis 12, i.e. towards the direction Y1. The switch shaft 16 is engaged with the slanted opening 17 in a slidable manner.

As shown in FIG. 1, a pair of locking members 18 is provided at two opposite sides of the upper chassis 12. The locking members 18 each have a supporting hole 18a. Moreover, the upper chassis 12 is provided with a pair of supporting shafts 19 at the two opposite sides, and the two supporting shafts 19 are engaged with the two corresponding supporting holes 18a such that the two locking members 18 are rotatably supported by the corresponding sides of the upper chassis 12.

Referring to FIGS. 1 and 2, the locking members 18 are each provided with an oblong hole 18b. Furthermore, the lower chassis 11 has a pair of locking shafts 21 fixed to two opposite sides of the lower chassis 11, and each locking shaft 21 is disposed away from the corresponding connection shaft 13 towards the back of the lower chassis 11 (towards the direction Y1). The locking shafts 21 are engaged with the corresponding oblong holes 18b.

FIGS. 2 and 3 each illustrate a stand-by mode for disc insertion. In this mode, the switch slider 15 provided in the lower chassis 11 is in its rearmost position towards the direction Y1. Specifically, the switch shaft 16 of the switch slider 15 is positioned at the rear end of the slanted opening 17 of the upper chassis 12. Thus, the rear portion of the lower chassis 11 is tilted downward away from the upper chassis 12 with respect to the connection shafts 13 acting as a fulcrum.

Because the rear portion of the lower chassis 11 is tilted downward, the locking shafts 21 of the lower chassis 11 allow the locking members 18 to move counterclockwise. As a result, a front segment 18c of each locking member 18 presses against the undersurface of the upper cover 2, and a rear segment 18d of each locking member 18 presses against the upper surface of the lower cover 3. Consequently, the driving device 10 is locked between the upper cover 2 and the lower cover 3.

Referring to FIG. 3, in the stand-by mode, the turntable 22 of the lower chassis 11 moves downward away from the clamper 23 so as to form a space between the turntable 22 and the clamper 23.

When the insertion of the disc D is detected, the mode-switching unit 30, which will be described later in detail, moves the switch slider 15 in the direction Y2 so as to switch to a disc-driving mode. Referring to FIG. 4, the switch shaft 16 of the switch slider 15 moves to the front end of the slanted opening 17. Thus, referring to FIG. 5, the lower chassis 11 is tilted clockwise with respect to the connection shafts 13 acting as a fulcrum, so as to clamp a central hole Da of the disc D between the turntable 22 of the lower chassis 11 and the clamper 23 of the upper chassis 12.

Furthermore, as shown in FIG. 4, for raising the locking shafts 21 of the lower chassis 11, the locking members 18 move clockwise with respect to the supporting shafts 19 so that the front segments 18c move away from the upper cover 2 and the rear segments 18d move away from the lower cover 3. Consequently, the driving device 10 is released from the locked state and is thus resiliently supported by the dampers 5 and 7 inside the external casing 1A.

Referring to FIG. 2, the front portion of the upper chassis 12 is provided with roller arms 27. Each roller arm 27 has a supporting shaft 27a disposed at the front end of the roller arm 27 such that the supporting shaft 27a is rotatably supported by the upper chassis 12. The rear ends of the roller arms 27 rotatably support a roller shaft 28a of a transfer roller (a disc-transferring member) 28. The front end of each locking member 18 is provided with a control hole 18e, and the roller shaft 28a engages with each control hole 18e.

In the stand-by mode of FIGS. 2 and 3, because the locking members 18 are moved counterclockwise, the roller shaft 28a is lifted upward by the control holes 18e. When the disc D is inserted in the direction Y1 through the opening 9 of the external casing 1A, the transfer roller 28 and a sliding member facing the transfer roller 28 (not shown in the drawings) nip the disc D. In the disc-driving mode shown in FIGS. 4 and 5, because the locking members 18 are moved clockwise, the roller shaft 28a is lowered by the control holes 18e of the locking members 18 so that the transfer roller 28 moves away from the disc D, which is clamped to the turntable 22.

FIGS. 6 to 9 are bottom plan views of the lower chassis 11 of the driving device 10. In detail, from the state shown in FIG. 1, the lower chassis 11 in FIGS. 6 to 9 is rotated horizontally by 180° and is turned over such that the undersurface of the lower chassis 11 faces upward. Thus, referring to FIGS. 6 to 9, the term "undersurface" will be referred to as the surface of the lower chassis 11 adjacent to the viewer. Accordingly, in FIGS. 6 to 9, the direction X2 points toward the right of the drawings, and a direction X1 points toward the left of the drawings. Moreover, the direction Y2, adjacent to which the opening 9 is provided, points toward the bottom of the drawings.

Referring to FIGS. 6 to 9, one of the connection shafts 13 and one of the locking shafts 21 protrude from the right side of the lower chassis 11. Furthermore, a section of the undersurface of the lower chassis 11 adjacent to the direction X2 supports the switch slider 15 such that the switch slider 15 is linearly slidable in the directions Y1 and Y2. The switch shaft 16 is fixed to the switch slider 15, and moves together with the switch slider 15 in the directions Y1 and Y2. An end of the switch slider 15 adjacent to the direction Y1 is provided with a supporter 15a, and similarly, the undersurface of the lower chassis 11 is provided with a supporter 11a. An invertible spring 29 is disposed between the supporter 15a and the supporter 11a.

Figure 6:
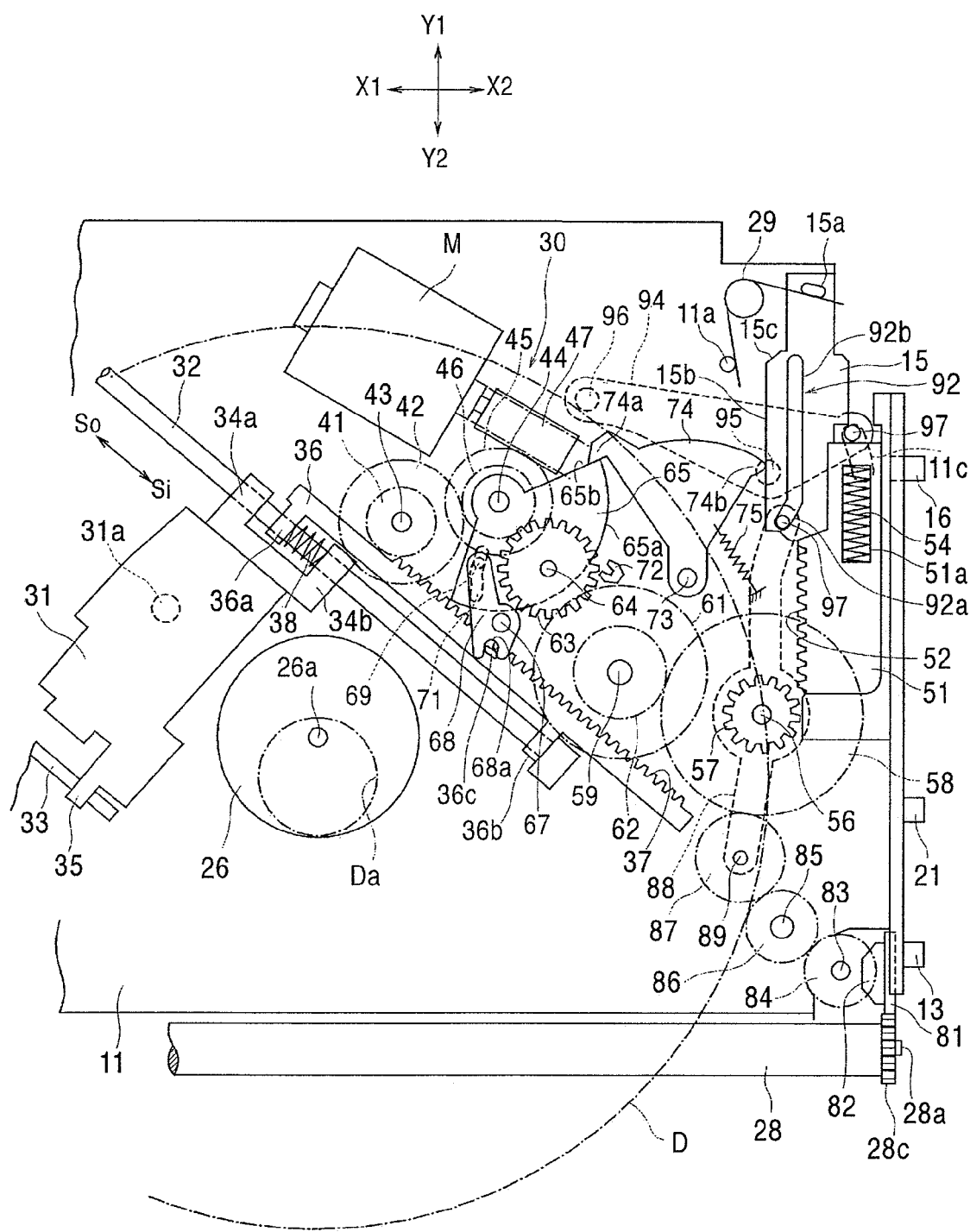
FIG. 6 is a bottom plan view of a lower chassis of the driving device in the stand-by mode.

In the stand-by mode in FIG. 6, the switch slider 15 is shifted toward the direction Y1, and the invertible spring 29 resiliently biases the switch slider 15 in the direction Y1 so that the switch slider 15 is maintained at a first position. On the other hand, in the disc-driving mode in FIG. 9, the switch slider 15 is shifted toward the direction Y2. In this state, the biasing direction of the invertible spring 29 is switched to the direction Y2 so that the switch slider 15 is maintained at a second position.

The undersurface of the lower chassis 11 is further provided with the mode-switching unit 30 for controlling the shifting of the switch slider 15. Specifically, the mode-switching unit 30 is for switching different transmission paths for transmitting power from the motor M, namely, a sled-power transmission path for moving an optical pickup (head) 31, a switching-power transmission path for moving the switch slider 15, and a rolling-power transmission path for driving the transfer roller 28. Such transmission paths will be described later in detail.

Various types of gears are shown in FIGS. 6 to 9. In FIGS. 6 to 9, some of the gears that require descriptions of their engagement manner are provided with an illustration of gear teeth, whereas the illustration of the gear teeth is omitted for the other gears that do not require such descriptions. Accordingly, each of the gears without the illustration of gear teeth is indicated by a pitch circle.

Referring to FIG. 1, the lower chassis 11 is provided with an aperture 11b. The optical pickup 31 is disposed in the undersurface of the lower chassis 11 and is exposed on the top surface of the lower chassis 11 through the aperture 11b. The top surface of the optical pickup 31 is provided with an objective lens 31a. The optical pickup 31 contains a light emitter for emitting laser beams toward the objective lens 31a, a photo acceptor for receiving reflected light beams from the disc D, and other optical elements.

Referring to FIGS. 6 to 9, the undersurface of the lower chassis 11 is provided with a guide shaft 32 and a guide 33 which are disposed parallel to each other and extend at an angle with respect to the directions X1 and X2 and the directions Y1 and Y2. As shown in FIG. 6, a first end of the optical pickup 31 is provided with shaft receivers 34a and 34b which are separated by a certain distance in the moving direction of the optical pickup 31. The guide shaft 32 extends through the shaft receivers 34a and 34b such that the shaft receivers 34a and 34b are slidable with respect to the guide shaft 32. On the other hand, a second end of the optical pickup 31 is provided with a forked slider 35 which clamps the guide 33 so as to engage with the guide 33 in a slidable manner. Consequently, the optical pickup 31 is guided by the guide shaft 32 and the guide 33 to move toward and away from the center of the disc D, which is clamped to the turntable 22. These two directions, in which the optical pickup 31 moves toward and away from the center of the disc D, will be referred to as a direction Si and a direction So, respectively.

Furthermore, a rack 36 which moves in conjunction with the optical pickup 31 is provided. The rack 36 is provided with gear teeth 37 which are arranged at a predetermined distance along the longitudinal direction of the rack 36. The rack 36 is further provided with shaft receivers 36a and 36b which are disposed along the moving direction of the optical pickup 31 and are separated by a predetermined distance. The shaft receiver 36a is positioned between the shaft receivers 34a and 34b of the optical pickup 31, and the guide shaft 32 extends through the shaft receiver 36a such that the shaft receiver 36a is slidable with respect to the guide shaft 32.

Furthermore, a compression spring (biasing member) 38 is disposed between the shaft receiver 34b and the shaft receiver 36a. The guide shaft 32 extends through the compression spring 38.

The compression spring 38 is disposed between the shaft receiver 36a and the shaft receiver 34b in a compressed state such that the resilient force of the compression spring 38 biases the shaft receiver 36a and the entire rack 36 in the direction So. In FIG. 6, the shaft receiver 36a is not in contact with the shaft receiver 34a since the rack 36 is being pulled in the direction Si with respect to the optical pickup 31. On the other hand, as shown in FIG. 9, when a force pulling the optical pickup 31 and the rack 36 away from each other is not in effect, the resilient force of the compression spring 38 allows the shaft receiver 36a to come into contact with the shaft receiver 34a. Thus, the optical pickup 31 and the rack 36 in this state are capable of moving together in the directions So and Si.

Figure 7:
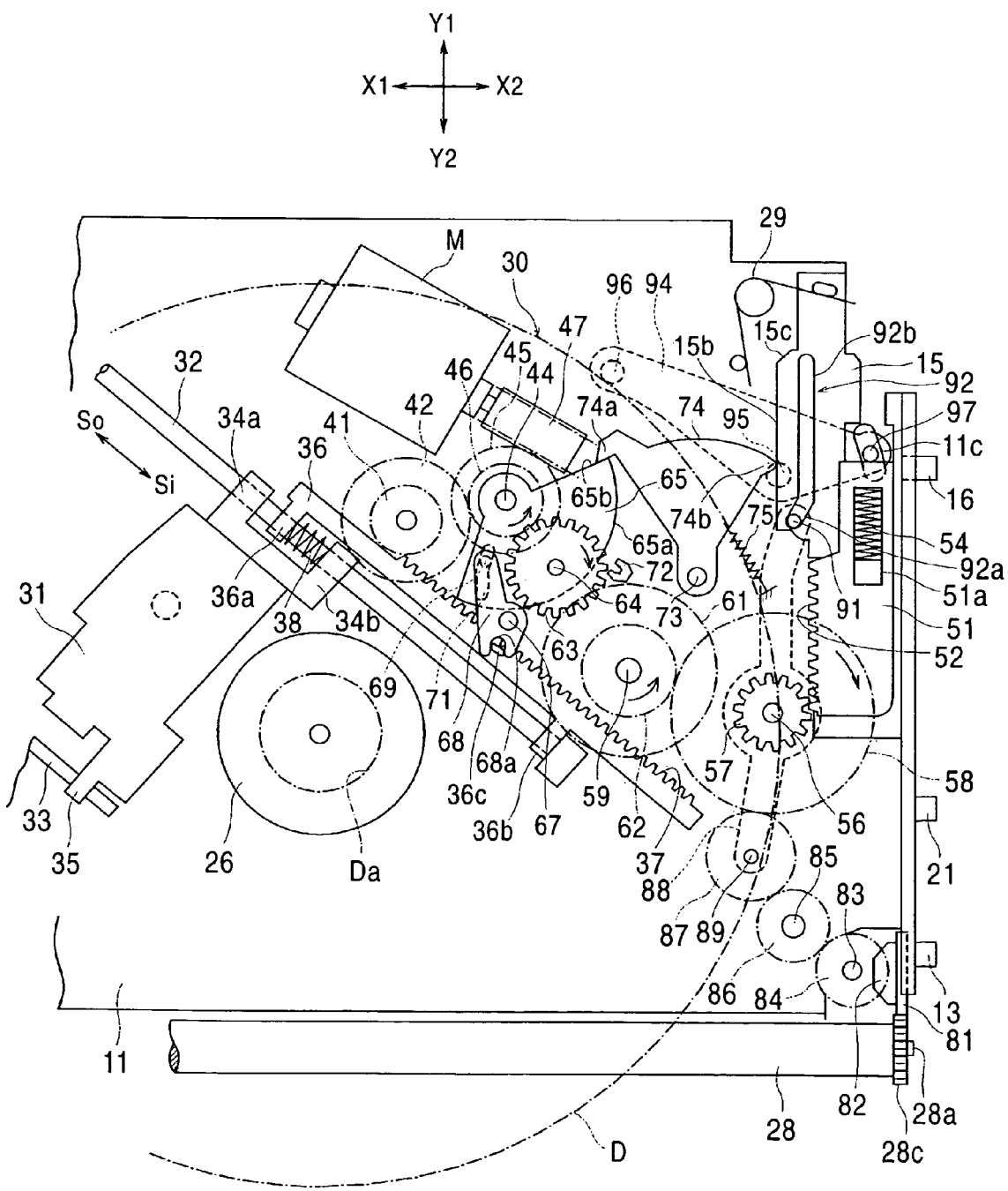
FIG. 7 is another bottom plan view of the lower chassis of the driving device in a state where disc insertion is detected.

A shaft 43 is fixed to the undersurface of the lower chassis 11 at a position near one of the sides of the rack 36. Moreover, a combination of a pinion gear (first pinion gear) 41 and a transmission gear 42 is supported by the shaft 43 such that the pinion gear 41 and the transmission gear 42 rotate in conjunction with each other. Referring to FIGS. 6 to 8, the gear teeth 37 are not in contact with the pinion gear 41, but when the rack 36 is moved in the direction So, as shown in FIG. 9, the gear teeth 37 engage with the pinion gear 41.

Furthermore, a shaft 44 is fixed to the undersurface of the lower chassis 11 at a position near the transmission gear 42. Moreover, a combination of a driving gear 45 and a sun gear 46 is supported by the shaft 44 such that the driving gear 45 and the sun gear 46 rotate in conjunction with each other. The sun gear 46 engages with the transmission gear 42, and the driving gear 45 engages with a worm gear 47 which is disposed on an output shaft of the motor M fixed to the lower chassis 11.

According to the first embodiment, a transmission path from the worm gear 47 to the gear teeth 37 (namely, in the order: the worm gear 47, the driving gear 45, the sun gear 46, the transmission gear 42, the pinion gear 41, and the gear teeth 37) is defined as the sled-power transmission path, which was mentioned previously.

Referring to FIG. 6, an engagement member 51 is disposed on the switch slider 15. The engagement member 51 is combined with the switch slider 15 such that the engagement member 51 is slightly movable in the directions Y1 and Y2 with respect to the movement of the switch slider 15. A side of the engagement member 51 adjacent to the direction X1 is provided with a rack 52 which extends in the directions Y1 and Y2. On the other hand, as shown in FIG. 9, the switch slider 15 is also provided with a rack 53 extending in the directions Y1 and Y2. The racks 52 and 53 have the same shape. In the state shown in FIG. 6, the rack 53 of the switch slider 15 and the rack 52 of the engagement member 51 completely overlap each other.

The engagement member 51 is provided with a rectangular slit opening 51a extending longitudinally in the directions Y1 and Y2. The slit opening 51a contains a compression spring 54. The compression spring 54 is disposed in the slit opening 51a in a compressed state, and thus biases the engagement member 51 in the direction Y1. In the state shown in FIG. 6, since no external force is applied to the engagement member 51, the engagement member 51 is in a state where it is in a position closer to the direction Y1 while being combined with the switch slider 15. When the engagement member 51 is moved in the direction Y2 from this state in FIG. 6, the compression spring 54 applies its resilient force against the engagement member 51 such that the engagement member 51 can only move slightly by a predetermined distance in the direction Y2 above the switch slider 15.

A shaft 56 is fixed to the undersurface of the lower chassis 11 at a position adjacent to the direction X2. Moreover, a combination of a pinion gear (second pinion gear) 57 and a transmission gear 58 is supported by the shaft 56 such that the pinion gear 57 and the transmission gear 58 rotate in conjunction with each other. In FIG. 6, the racks 52 and 53 are not in contact with the pinion gear 57, but when the switch slider 15 and the engagement member 51 are moved in the direction Y2, as shown in FIGS. 7 to 9, both racks 52 and 53 engage with the pinion gear 57.

Furthermore, a shaft 59 is fixed to the undersurface of the lower chassis 11 at a position near the transmission gear 58. Moreover, a combination of a first intermediate gear 61 and a second intermediate gear 62 is supported by the shaft 59 such that the intermediate gears 61 and 62 rotate in conjunction with each other. The second intermediate gear 62 is constantly engaged with the transmission gear 58.

Furthermore, the sun gear 46 is engaged with a planet gear 63. Referring to FIGS. 6 to 8, the planet gear 63 is engaged with the first intermediate gear 61. In this state, a transmission path from the worm gear 47 to the racks 52 and 53 (namely, in the order: the worm gear 47, the driving gear 45, the sun gear 46, the planet gear 63, the first intermediate gear 61, the second intermediate gear 62, the transmission gear 58, the pinion gear 57, and the racks 52 and 53) is defined as the switching-power transmission path.

In the mode-switching unit 30, a fan-shaped switching member 65 is rotatably supported by the shaft 44. Moreover, a shaft 64 is fixed to the switching member 65, and the planet gear 63 is rotatably supported by the shaft 64. The fan-shaped switching member 65 has an arc periphery 65a extending in a circular-arc fashion at a predetermined radius with respect to the shaft 64, and a stopper 65b extending from one of the ends of the arc periphery 65a in the radius direction of the switching member 65.

Referring to FIG. 6 and to FIGS. 10 to 12, a shaft 67 is disposed between the shifting path of the rack 36 and the switching member 65, and a transmission member 68 is rotatably supported by the shaft 67. A first end of the transmission member 68 is provided with a transmission recess 68a. Furthermore, the rack 36 is provided with a transmission protrusion 36c. When the rack 36 is moving in the direction Si, the transmission protrusion 36c is engaged with the transmission recess 68a.

Referring to FIGS. 10 to 12, the switching member 65 includes a switching cam 71. In the presently preferred embodiments, the switching cam 71 is either a cam groove or a cam hole. A transmission shaft 69 is fixed to a second end of the transmission member 68 and is engaged with the switching cam 71 in a slidable manner. As shown in FIG. 12, the switching cam 71 has a switching portion 71a and a supporting portion 71b which are continuously linked to each other. The switching portion 71a extends in the radius direction of the switching member 65 with respect to the shaft 44. On the other hand, the supporting portion 71b is arc-shaped. FIG. 12 shows a state where the transmission member 68 is rotated clockwise while the switching member 65 is rotated counterclockwise. In this state of motion, the central line of the arc-shaped supporting portion 71b is aligned with an orbital path R of the transmission shaft 69, which arcuately revolves around the center of the shaft 67 at a constant radius.

Referring to FIG. 6, an intermediate member 72 is fixed to the lower chassis 11 at a position near the arc periphery 65a of the switching member 65. The intermediate member 72 has two teeth that are engageable with the gear teeth of the planet gear 63. Referring to FIGS. 8 to 12, in the process of the planet gear 63 moving from one position to another, the gear teeth of the planet gear 63 engage with the teeth of the intermediate member 72.

Furthermore, a shaft 73 is fixed to the lower chassis 11 at a position between the switching member 65 and the switch slider 15. Moreover, a restraining member 74 is rotatably supported by the shaft 73. The restraining member 74 has a hook 74a that extends outward from the left side of the restraining member 74, and a contact portion 74b at the right side of the restraining member 74. The restraining member 74 is constantly biased (pulled) in the clockwise direction by a biasing member 75.

The switch slider 15 has a restriction segment 15b that is provided at a side of the switch slider 15 adjacent to the direction X1 and that extends linearly in the directions Y1 and Y2, i.e. the sliding direction of the switch slider 15. Furthermore, one end of the restriction segment 15b adjacent to the direction Y1 is provided with a restriction-free portion 15c that is depressed in the direction X2 from the restriction segment 15b. In the stand-by mode in FIG. 6, the contact portion 74b of the restraining member 74 is in contact with the restriction segment 15b such that the restraining member 74 is restricted from rotating in the clockwise direction (i.e. a restraint-releasing direction). In this state, the hook 74a of the restraining member 74 is hooked onto the stopper 65b of the switching member 65 such that the switching member 65 is restricted from rotating in the counterclockwise direction.

Referring to FIGS. 8 and 9, when the switch slider 15 is shifted in the direction Y2 and the restriction segment 15b is released from the contact portion 74b, the biasing force of the biasing member 75 allows the restraining member 74 to rotate clockwise. Thus, the hook 74a is released from the stopper 65b so that the switching member 65 becomes free from the restriction of rotation.

Referring to FIGS. 1 to 6, a transmission gear 81 is provided at a corner of the lower chassis 11 in a rotatable manner. Specifically, the transmission gear 81 is disposed on one of the sides of the lower chassis 11 adjacent to the direction X2 and at the corner adjacent to the direction Y2. Referring to FIG. 6, one end of the transfer roller 28 is provided with a roller gear 28c. In the stand-by mode shown in FIG. 2 where the transfer roller 28 is lifted upward, the roller gear 28c and the transmission gear 81 are engaged with each other such that the rotational force of the transmission gear 81 allows the transfer roller 28 to rotate in forward and backward directions.

Referring to FIG. 6, a combination of the transmission gear 81 and a bevel gear 82 is rotatably supported by the lower chassis 11. Furthermore, the lower chassis 11 is provided with a bevel gear 84 that is rotatably supported by a shaft 83. The bevel gear 82 and the bevel gear 84 are constantly engaged with each other. Moreover, a shaft 85 is fixed to the lower chassis 11, and an intermediate gear (third intermediate gear) 86 is rotatably supported by the shaft 85. The bevel gear 84 includes a spur gear portion which is constantly engaged with the intermediate gear 86.

Furthermore, a switching gear 87 is disposed between the transmission gear 58 and the intermediate gear 86. In the stand-by mode in FIG. 6, the switching gear 87 is engaged with both the transmission gear 58 and the intermediate gear 86. In this state, a transmission path for transmitting a rotational force from the motor M to the transfer roller 28 (namely, in the order: the worm gear 47, the driving gear 45, the sun gear 46, the planet gear 63, the first intermediate gear 61, the second intermediate gear 62, the transmission gear 58, the switching gear 87, the intermediate gear 86, the bevel gear 84, the bevel gear 82, the transmission gear 81, and the roller gear 28c) is defined as the rolling-power transmission path.

The shaft 56 supporting the transmission gear 58 rotatably supports a switching arm 88. A first end of the switching arm 88 has a shaft 89 fixed thereto, and the shaft 89 rotatably supports the switching gear 87. The transmission gear 58 and the switching gear 87 have a sun-and-planet relationship such that the switching gear 87 is capable of revolving around the transmission gear 58. A second end of the switching arm 88 has a switching pin 91 fixed thereto and extends to a position where it overlaps with the switch slider 15.

As shown in FIG. 6, the switch slider 15 is provided with a transmission cam 92. In the presently preferred embodiments, the transmission cam 92 is either a cam groove or a cam hole. The switching pin 91 is engaged with the transmission cam 92 in a slidable manner.

The transmission cam 92 has an engagement portion 92a extending at an angle toward a first end of the transmission cam 92 adjacent to the direction Y2, and a releasing portion 92b extending linearly along the shifting direction of the switch slider 15 toward a second end of the transmission cam 92 adjacent to the direction Y1.

In the stand-by mode in FIG. 6, because the switch slider 15 is shifted to a position adjacent to the direction Y1, the engagement portion 92a forces the switching arm 88 to rotate counterclockwise. Consequently, the switching gear 87 engages with both the transmission gear 58 and the intermediate gear 86. On the other hand, referring to FIGS. 8 and 9, when the switch slider 15 is shifted in the direction Y2, the releasing portion 92b forces the switching arm 88 to rotate clockwise. As a result, the switching gear 87 is released from the intermediate gear 86. This cuts off the rolling-power transmission path between the transmission gear 58 and the roller gear 28c.

Referring to FIG. 1, the upper chassis 12 is provided with a detector 94. In FIG. 6, this detector 94 is indicated by a dashed line. The detector 94 is rotatably supported by a shaft 95, which is fixed to the undersurface of the upper chassis 12 and functions as a fulcrum for the detector 94. A first end of the detector 94 has a detector pin 96 fixed thereto. The detector pin 96 is located in the disc-transferring path of the disc D inserted through the opening 9. As shown in FIG. 7, when the central hole Da of the disc D transferred by the transfer roller 28 reaches a position corresponding to the turntable 22, the periphery of the disc D adjacent to the direction Y1 presses against the detector pin 96.

Furthermore, a second end of the detector 94 has a trigger pin 97 fixed thereto. Referring to FIG. 6, the trigger pin 97 extends through an arc-shaped oblong hole 11c provided in the lower chassis 11 to reach the undersurface of the lower chassis 11. The trigger pin 97 is disposed in a position where it is capable of pressing against an edge of the engagement member 51 adjacent to the direction Y1.

Stand-By Mode

Referring to FIG. 6, the stand-by mode is a mode in which the switch slider 15 is shifted to its rearmost position, which was described previously, toward the direction Y1. This rearmost position is referred to as the first position.

In FIG. 6, the invertible spring 29 biases the switch slider 15 in the direction Y1 so as to maintain the switch slider 15 at the first position. In this state, neither the rack 53 of the switch slider 15 nor the rack 52 of the engagement member 51 are in contact with the pinion gear 57.

On the other hand, when the switch slider 15 is shifted in the direction Y1 for the stand-by mode, the contact portion 74b of the restraining member 74 comes into contact with the restriction segment 15b of the switch slider 15 so as to force the restraining member 74 to rotate counterclockwise. In this rotated position, i.e. a restrained position, the restraining member 74 is restricted from rotating in the clockwise direction. Moreover, the hook 74a of the restraining member 74 is hooked onto the stopper 65b of the switching member 65 so that the switching member 65 is restricted from rotating in the counterclockwise direction.

As described above, in the stand-by mode in FIG. 6, the switching member 65 is rotated clockwise and is held at a transmission position by the hook 74a. Moreover, the planet gear 63 is maintained in a state where it is engaged with the first intermediate gear 61. Furthermore, the rotation of the switching member 65 in the clockwise direction forces the transmission member 68 to rotate counterclockwise, thus allowing the rack 36 to be pulled in the direction Si. This compresses the compression spring 38, and as a result, the shaft receiver 36a of the rack 36 is shifted away from the shaft receiver 34a of the optical pickup 31. Accordingly, the rack 36 is maintained in a state where the gear teeth 37 of the rack 36 are not in contact with the gear teeth of the pinion gear 41.

Furthermore, the switching pin 91 of the switching arm 88, which is rotatable around the shaft 56, is positioned in the engagement portion 92a of the transmission cam 92 provided in the switch slider 15 such that the switching arm 88 is rotated counterclockwise. Thus, the switching gear 87 supported by the switching arm 88 is engaged with both the transmission gear 58 and the intermediate gear 86.

Accordingly, in the stand-by mode, the pinion gear 41 and the gear teeth 37 are not engaged with each other, and moreover, the pinion gear 57 is not engaged with the racks 52 and 53. Thus, in the stand-by mode, only the rolling-power transmission path for transmitting the power of the motor M to the roller gear 28c is in effect.

Because the switch slider 15 and the switch shaft 16 are shifted toward the direction Y1 in the stand-by mode, the lower chassis 11, as shown in FIGS. 2 and 3, is tilted with respect to the connection shafts 13 and acts as a fulcrum such that the rear portion of the lower chassis 11 is lowered. This moves the turntable 22 away from the clamper 23. As shown in FIG. 2, each of the locking members 18 is rotated counterclockwise by the corresponding locking shaft 21 provided in the lower chassis 11 so that the front segment 18c of the locking member 18 comes into contact with the upper cover 2 and the rear segment 18d comes into contact with the lower cover 3. Accordingly, the driving device 10 becomes in a locked state inside the external casing 1A.

Furthermore, the control hole 18e of the locking member 18 forces the transfer roller 28 to be lifted upward so that the transfer roller 28 is positioned where it is capable of transmitting power to the disc D. Moreover, referring to FIG. 6, the roller gear 28c provided at one end of the transfer roller 28 engages with the transmission gear 81.

Consequently, when the motor M is driven in the stand-by mode, only the transfer roller 28 is rotated, whereas the rack 36 and the switch slider 15 are not shifted, and the relationship between the driving device 10 and the external casing 1A shown in FIGS. 2 and 3 is maintained. In this state, when the motor M is driven in one direction, the transfer roller 28 is rotated in a direction for disc insertion so as to transfer the disc D inserted into the external casing 1A through the opening 9 in the direction Y1. In contrast, when the motor M is driven in the other direction, the transfer roller 28 is rotated in a direction for disc ejection so as to eject unclamped disc D from the turntable 22 outward through the opening 9.

Switching Operation from Stand-By Mode to Disc-Driving Mode:

In the stand-by mode shown in FIGS. 2, 3, and 6, the motor M is driven when an insertion detector (not shown), detects the insertion of the disc D through the opening 9. Here, the sun gear 46 rotates counterclockwise, and the planet gear 63 and the pinion gear 57 rotate clockwise. Moreover, the transfer roller 28 rotates in the direction for transferring the disc D in the direction Y1, that is, in the counterclockwise direction in FIGS. 2 and 3.

Referring to FIG. 6, as the disc D is transferred in the direction Y1, before the central hole Da of the disc D reaches the position corresponding to the turntable 22, the periphery of the disc D adjacent to the direction Y1 comes into contact with the detector pin 96. Subsequently, referring to FIG. 7, when the disc D is transferred further toward the direction Y1 such that the central hole Da becomes substantially aligned with the turntable 22, the periphery of the disc D presses the detector pin 96 in the direction Y1 and rotates the detector 94 clockwise.

As shown in FIG. 7, when the detector 94 rotates clockwise, the trigger pin 97 of the detector 94 presses against the biasing force of the compression spring 54 to move the engagement member 51 in the direction Y2. Thus, the rack 52 becomes engaged with the pinion gear 57. As described previously, because the pinion gear 57 is rotating clockwise at this point, the rotational force of the pinion gear 57 pulls the engagement member 51 in the direction Y2, thus allowing the switch slider 15 to also be pulled in the direction Y2. Consequently, the rack 53 of the switch slider 15 and the rack 52 of the engagement member 51 become engaged with the pinion gear 57.

Subsequently, the rotational force of the pinion gear 57 forces the switch slider 15 to move further in the direction Y2. Just after the switch slider 15 starts to move, the switching pin 91 of the switching arm 88 is released from the engagement portion 92a of the transmission cam 92 and is led towards the releasing portion 92b. Referring to FIG. 8, the switching arm 88 thus rotates clockwise, and the switching gear 87 supported by the switching arm 88 is released from the intermediate gear 86. Accordingly, just after the central hole Da of the disc D is aligned with the turntable 22, the rolling-power transmission path between the motor M and the transfer roller 28 is cut off and the transfer roller 28 stops rotating.

As shown in FIG. 8, when the switch slider 15 is shifted further in the direction Y2 after the transfer roller 28 stops rotating, the contact portion 74b of the restraining member 74 slides away from the restriction segment 15b of the switch slider 15 and comes into contact with the restriction-free portion 15c of the switch slider 15. The restraining member 74, free from the restriction segment 15b, is rotated clockwise by the biasing force (pulling force) of the biasing member 75 so that the hook 74a is released from the stopper 65b of the switching member 65.

In the state shown in FIG. 8, the planet gear 63 rotates clockwise such that a force for driving the switch slider 15 is applied to the first intermediate gear 61. This implies that when the switching member 65 becomes free from the restriction of rotation, the gear teeth of the planet gear 63 rotating clockwise become disengaged from the gear teeth of the first intermediate gear 61. Subsequently, referring to FIG. 11, the gear teeth of the planet gear 63 engage with the gear teeth of the intermediate member 72. Moreover, the planet gear 63 still rotates clockwise while being engaged with the intermediate member 72 and thus kicks back the intermediate member 72 so that, as shown in FIG. 12, the planet gear 63 arcuately revolves counterclockwise around the sun gear 46. Consequently, as shown in FIG. 9, the switching member 65 is rotated counterclockwise by a significant amount to reach a cut-off position.

During this process, referring to FIGS. 8 to 12, the switching portion 71a of the switching cam 71 provided in the switching member 65 allows the transmission member 68 to rotate clockwise. Thus, the transmission recess 68a of the transmission member 68, which is engaged with the transmission protrusion 36c, presses the transmission protrusion 36c in the direction So. Moreover, the resilient force of the compression spring 38 moves the rack 36 in the direction So. Accordingly, the gear teeth 37 of the rack 36 become engaged with the pinion gear 41. Because the planet gear 63 is rotating clockwise and the pinion gear 41 is also rotating clockwise at this point, the rack 36 is pulled towards the direction So by the pinion gear 41 so that the transmission protrusion 36c of the rack 36 becomes disengaged from the transmission recess 68a of the transmission member 68.

Referring to FIGS. 9 to 12, when the transmission protrusion 36c is disengaged from the transmission recess 68a, the transmission shaft 69 of the transmission member 68 enters the supporting portion 71b of the switching cam 71 provided in the switching member 65. As described previously, in the state shown in FIG. 12, the central line of the arc-shaped supporting portion 71b is aligned with the orbital path R of the transmission shaft 69, which arcuately revolves around the center of the shaft 67 at a constant radius. Accordingly, in the state shown in FIGS. 9 and 12, any improper movement of the transmission member 68 and the switching member 65 is prevented.

When the switch slider 15 moves in the direction Y2 and reaches the second position, which was mentioned previously, the stand-by mode is switched to the disc-driving mode. In the disc-driving mode, the switch slider 15 is biased toward the direction Y2 by the invertible spring 29 such that the position of the switch slider 15 is stabilized.

Disc-Driving Mode:

Referring to FIG. 9, in the disc-driving mode, the resilient force of the compression spring 38 forces the shaft receiver 36a of the rack 36 to be in contact with the shaft receiver 34a of the optical pickup 31. In this state, the optical pickup 31 and the rack 36 move together with respect to the guide shaft 32 and the guide 33.

Referring to FIGS. 9 to 12, in the disc-driving mode, the switching member 65 is rotated counterclockwise and the planet gear 63 is not in contact with the first intermediate gear 61 such that the power transmission path between the planet gear 63 and the first intermediate gear 61 is cut off.

When the motor M is driven in the forward or backward direction, the rotational force of the worm gear 47 is transmitted to the transmission gear 42 via the driving gear 45 and the sun gear 46 to drive the pinion gear 41. In the disc-driving mode, if the pinion gear 41 is rotated clockwise by the motor M, the optical pickup 31 is driven toward the direction So, whereas if the pinion gear 41 is rotated counterclockwise by the motor M, the optical pickup 31 is driven toward the direction Si.

As shown in FIG. 9, the switch slider 15 and the switch shaft 16 provided in the switch slider 15 are positioned adjacent to the direction Y2 in the disc-driving mode. Accordingly, as shown in FIGS. 4 and 5, the lower chassis 11 is tilted clockwise with respect to the connection shafts 13 acting as a fulcrum, and the central hole Da of the disc D is thus held between the turntable 22 and the clamper 23. Moreover, as shown in FIG. 4, each of the locking members 18 is rotated clockwise such that the locking member 18 is moved away from the upper cover 2 and the lower cover 3. Thus, the driving device 10 is resiliently supported by the dampers 5 and 7.

Accordingly, the spindle motor 26 spins the disc D and the motor M drives the optical pickup 31 in the directions Si and So so as to read a data signal recorded on the disc D or to write a data signal onto the disc D.

Switching Operation from Disc-Driving Mode to Stand-By Mode:

For switching the disc-driving mode in FIG. 9 back to the stand-by mode in FIG. 6, the motor M is first driven to move the optical pickup 31 toward the direction Si. As the optical pickup 31 moves together with the rack 36 in the direction Si, the transmission protrusion 36*c* of the rack 36 becomes engaged with the transmission recess 68*a* of the transmission member 68. The moving force of the rack 36 allows the transmission member 68 to rotate counterclockwise.

When the transmission member 68 is rotated counterclockwise and the transmission shaft 69 enters the switching portion 71*a* of the switching cam 71, the moving force of the rack 36 is applied to the switching member 65 via the transmission member 68, thus rotating the switching member 65 clockwise. Here, the sun gear 46 rotates clockwise and the planet gear 63 rotates counterclockwise. Accordingly, as the switching member 65 rotates clockwise, the gear teeth of the planet gear 63 engage with the gear teeth of the intermediate member 72. Moreover, with its own rotational force, the planet gear 63 then kicks back the intermediate member 72 and the planet gear 63 arcuately revolves clockwise around the sun gear 46. As a result, the planet gear 63 becomes engaged with the first intermediate gear 61.

While the switching member 65 is being rotated clockwise in response to the rotation of the planet gear 63 in the counterclockwise direction, the rotational force of the switching member 65 is transmitted to the transmission member 68 via the switching cam 71. This rotates the transmission member 68 further in the counterclockwise direction while the engagement between the transmission recess 68*a* and the transmission protrusion 36*c* is maintained. Thus, the rotational force of the planet gear 63 forces the rack 36 to move further in the direction Si even after the optical pickup 31 moving in the direction Si is stopped at its final position. As a result, referring to FIG. 6, the shaft receiver 36*a* of the rack 36 moves away from the shaft receiver 34*a* of the optical pickup 31 and compresses the compression spring 38.

Consequently, when the switching member 65 rotates clockwise and the planet gear 63 engages with the first intermediate gear 61, the rotational force of the planet gear 63 is transmitted to the racks 52 and 53 via the first intermediate gear 61, the second intermediate gear 62, the transmission gear 58, and the pinion gear 57. Because the pinion gear 57 is rotated counterclockwise, the rotational force of the pinion gear 57 moves the switch slider 15 in the direction Y1. Accordingly, the disc-driving mode in FIG. 9 is switched back to the stand-by mode in FIG. 6.

Figure 13:
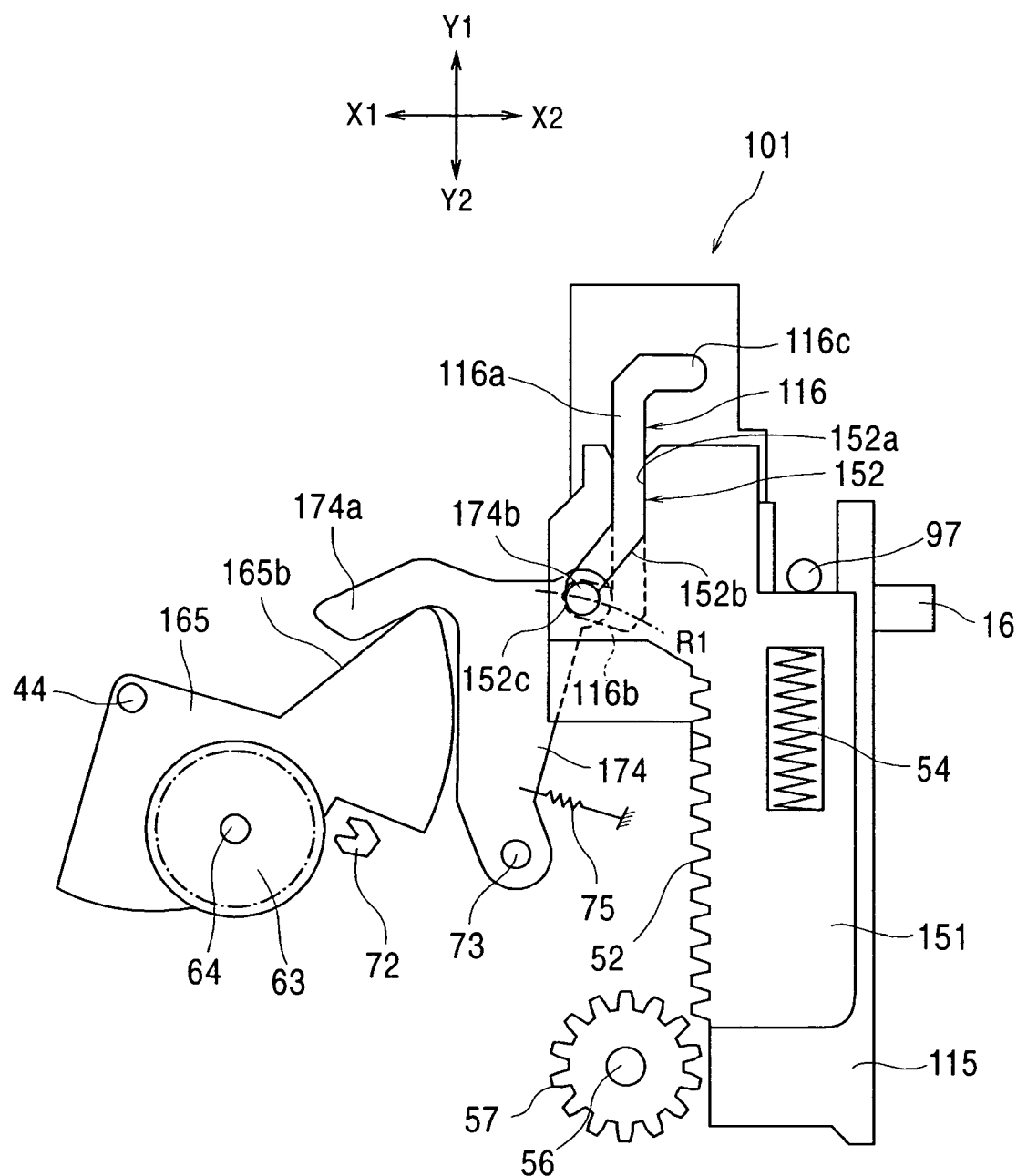
FIG. 13 is a partially-enlarged bottom plan view of a disc apparatus according to a second embodiment of the present invention in a stand-by mode.
Figure 14:
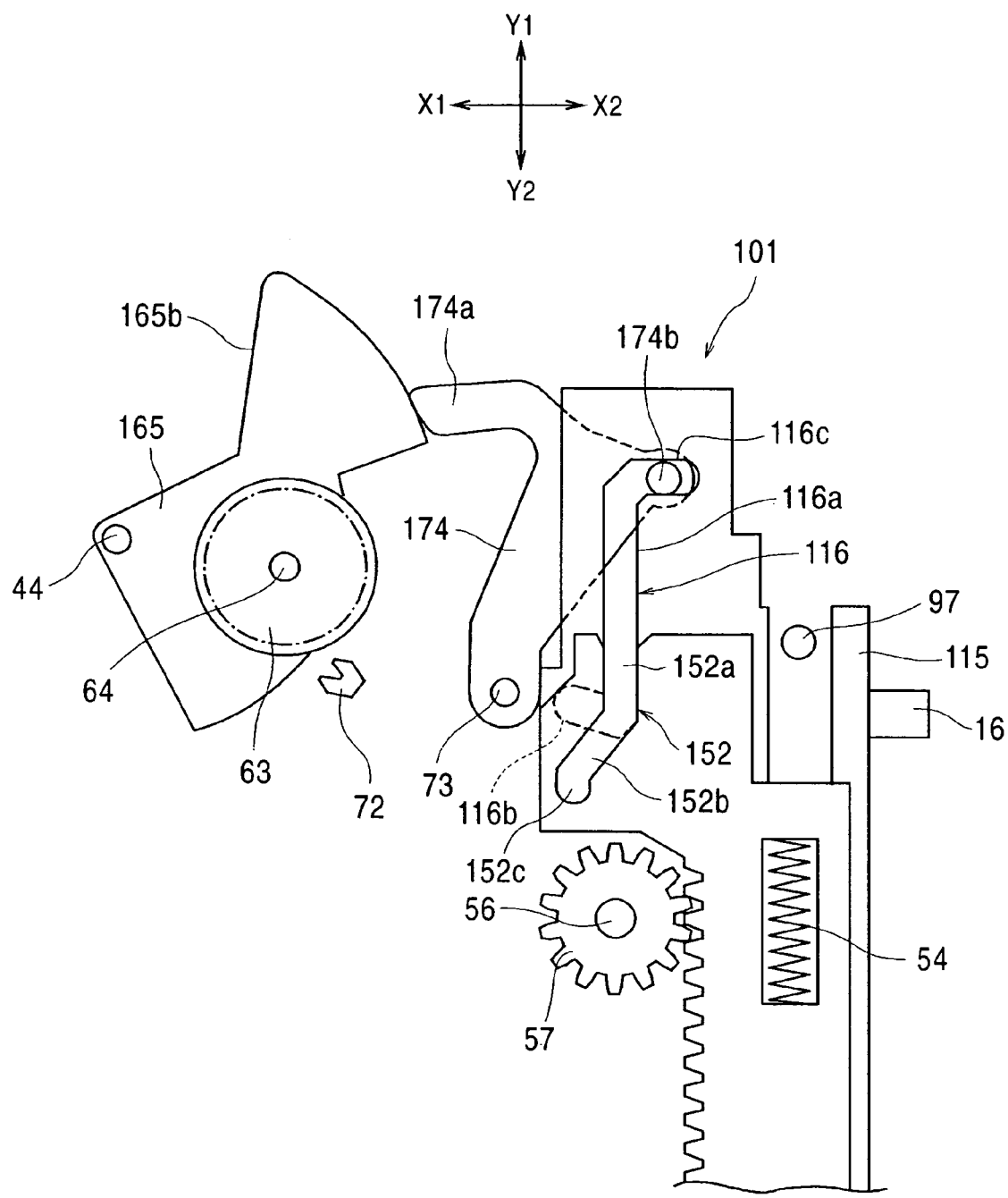
FIG. 14 is a partially-enlarged bottom plan view of the disc apparatus according to the second embodiment in a disc-driving mode.

FIGS. 13 and 14 illustrate a disc apparatus 101 according to a second embodiment of the present invention. Specifically, FIGS. 13 and 14 are bottom plan views of the lower chassis 11 equivalent to the ones shown in FIGS. 6 to 9 of the first embodiment. Similar to FIG. 6, FIG. 13 illustrates a stand-by mode for disc insertion. Furthermore, similar to FIG. 9, FIG. 14 illustrates a disc-driving mode.

Except for the section shown in FIGS. 13 and 14, the disc apparatus 101 of the second embodiment has the same structure as the disc apparatus 1 of the first embodiment shown in FIGS. 1 to 12 and operates basically in the same manner. Moreover, the components shown in FIGS. 13 and 14 that are equivalent to the ones in the disc apparatus 1 of the first embodiment are indicated by the same reference numerals, and the descriptions of those components will thus be omitted.

The disc apparatus 101 is provided with a switching member 165 which is rotatable with respect to the shaft 44. The switching member 165 is different from the switching member 65 of the first embodiment in that a stopper 165*b* of the switching member 165 has a different shape to that of the stopper 65*b* of the switching member 65. Furthermore, the disc apparatus 101 is provided with a restraining member 174 that is rotatable with respect to the shaft 73. The restraining member 174 is biased (pulled) in the clockwise direction by the biasing member 75.

The restraining member 174 is provided with a hook 174*a* that has a different shape from that of the hook 74*a* of the restraining member 74 according to the first embodiment. In the stand-by mode in FIG. 13, the hook 174*a* is hooked onto the stopper 165*b* of the switching member 165 such that the switching member 165 is restricted from rotating in the counterclockwise direction. As an alternative to the contact portion 74*b* in FIG. 6, the restraining member 174 is provided with a control shaft 174*b*.

As shown in FIGS. 13 and 14, the disc apparatus 101 of the second embodiment is provided with a switch slider 115. Switch slider 115 is provided with a cam 116, has basically the same function as the switch slider 15 of the first embodiment. The cam 116 is a cam hole. In detail, the cam 116 has a linear portion 116*a* extending linearly in the directions Y1 and Y2, i.e. the moving direction of the switch slider 115; a first supporting portion 116*b* extending from one end of the linear portion 116*a* adjacent to the direction Y2; and a second supporting portion 116*c* extending from the other end of the linear portion 116*a* adjacent to the direction Y1.

In the state shown in FIG. 13, the central line of the first supporting portion 116*b* is aligned with an orbital path R1 of the control shaft 174*b*, which arcuately revolves around the center of the shaft 73 at a constant radius. On the other hand, the second supporting portion 116*c* extends in the direction X2 from the linear portion 116*a* extending in the directions Y1 and Y2.

The disc apparatus 101 of the second embodiment is further provided with an engagement member 151 that has the same function as the engagement member 51 of the first embodiment. Like the engagement member 51 of the first embodiment, the engagement member 151 includes the rack 52. The engagement member 151 is provided with a cam 152, which is a cam hole. In detail, the cam 152 has a linear portion 152*a* that overlaps the linear portion 116*a*; a slanted portion 152*b* extending in the direction X1 at an angle from one end of the linear portion 152*a* adjacent to the direction Y2; and a restraining portion 152*c* extending in the direction Y2 from an end of the slanted portion 152*b*.

The control shaft 174*b* of the restraining member 174 engages with both the cam 116 and the cam 152 in a slidable manner.

In the stand-by mode in FIG. 13, the control shaft 174*b* is held by the first supporting portion 116*b* of the cam 116 and the restraining portion 152*c* of the cam 152. In FIG. 13, the compression spring 54 resiliently biases the engagement member 151 in the direction Y1 above the switch slider 115.

This biasing force allows the restraining portion 152c of the cam 152 to support the control shaft 174b.

Because the control shaft 174b is supported by the restraining portion 152c in the stand-by mode in FIG. 13, the restraining member 174 cannot rotate in the clockwise direction. Furthermore, the switch slider 115 is also held at a position closer to the direction Y1, namely, in a position where the racks 52 and 53 are not engaged with the pinion gear 57.

Subsequently, from the state in FIG. 13, when the trigger pin 97 presses against the engagement member 151 in the direction Y2, the control shaft 174b is released from the restraining portion 152c. Consequently, the biasing force of the biasing member 75 allows the restraining member 174 to rotate clockwise. The control shaft 174b thus moves along the orbital path R1 in the first supporting portion 116b to reach the linear portion 116a and the linear portion 152a. This allows the switch slider 115 to move in the direction Y2 according to the rotation of the pinion gear 57. On the other hand, when the control shaft 174b is being positioned in the linear portion 116a and the linear portion 152a, the hook 174a still remains hooked onto the stopper 165b such that the switching member 165 is still restricted from rotating in the counterclockwise direction.

When the switch slider 115 is moved further in the direction Y2 such that the stand-by mode is switched to the disc-driving mode shown in FIG. 14, the biasing force of the biasing member 75 allows the restraining member 174 to rotate clockwise and forces the control shaft 174b to enter the second supporting portion 116c of the cam 116 of the switch slider 115. This causes the hook 174a to move away from the stopper 165b and allows the switching member 165 to rotate counterclockwise.

Furthermore, because the control shaft 174b is in the second supporting portion 116c in the state in FIG. 14, the switch slider 115 is restricted from moving in the direction Y1.

In the disc apparatus 101 of the second embodiment, because the control shaft 174b of the restraining member 174 is held by the cam 116 of the switch slider 115 and the cam 152 of the engagement member 151, the positioning of the restraining member 174 can be regulated. Moreover, this prevents improper movement of the switch slider 115 in the stand-by mode in FIG. 13 and the disc-driving mode in FIG. 14. Therefore, the invertible spring 29 provided in the first embodiment is not necessary in the second embodiment, and moreover, the switch slider 115 of the second embodiment can be more stably held in the opposite end portions in comparison to the disc apparatus 1 of the first embodiment that includes the invertible spring 29.

As described above, in the above embodiment, the restriction segment 15b of the switch slider 15 restricts the rotation of the restraining member 74 in the clockwise direction, and the restraining member 74 restricts the rotation of the switching member 65 in the counterclockwise direction. Alternatively, the restraining member 74 does not necessarily have to be provided, and in that case, the restriction segment 15b may directly restrict the movement of the switching member 65.

Furthermore, the switching member 65 does not necessarily have to move in a rotatable manner, and may alternatively move in a linear manner. In such a case, the linear movement of the switching member 65 may control the positioning of the planet gear 63.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A disc apparatus comprising:
   a casing having an opening through which a disc may be inserted or ejected;
   a rotator to which a disc may be clamped;
   a disc-transferring member operable to transfer the disc between the opening and the rotator;
   a head positioned to face a recorded side of a disc clamped to the rotator, the head being movable toward and away from the center of the disc;
   a rack with gear teeth, the rack being movable together with the head;
   a first pinion gear engageable with the gear teeth of the rack;
   a motor operable to drive the first pinion gear;
   a switching member that moves between a transmission position and a cut-off position, the switching member connecting a power transmission path operable to transmit a driving force of the motor to the disc-transferring member when the switching member is in the transmission position, the switching member cutting off the power transmission path when the switching member is in the cut-off position; and
   a biasing member disposed between the head the rack, the biasing member biasing the rack towards the outer periphery of the disc;
   wherein when the rack moves towards the inner portion of the disc when the disc is not clamped to the rotator, a moving force of the rack allows the switching member to move from the cut-off position to the transmission position such that the driving force of the motor is transmitted to the disc-transferring member; and
   wherein when the switching member starts moving towards the transmission position in response to the movement of the rack towards the inner portion of the disc for connecting the power transmission path, the switching member forces the rack to move against the biasing force of the biasing member such that the rack is pulled towards the inner portion of the disc, whereby the gear teeth of the rack become disengaged from the first pinion gear.

2. The disc apparatus of claim 1, further comprising a detector for determining if the disc is transferred to a predetermined position in the casing, wherein when the detector determines that the disc is transferred to the predetermined position while the driving force of the motor is being transmitted to the disc-transferring member via the power transmission path, the driving force of the motor transmitted through the power transmission path allows the disc to be clamped to the rotator.

3. The disc apparatus of claim 1, further comprising a transmission member disposed between the rack and the switching member, the transmission member transmitting the moving force of the rack moving towards the inner portion of the disc to the switching member to move the switching member towards the transmission position.

4. The disc apparatus claim 3, wherein the switching member comprises a switching cam that engages with the transmission member, and
   wherein the switching cam restricts the movement of the transmission member when the switching member is in the transmission position to maintain the pulled state of the rack toward the inner portion of the disc and the disengaged state between the gear teeth of the rack and the first pinion gear.

5. The disc apparatus of claim 1, wherein the switching member further comprises a sun gear driven by the motor, and a planet gear engaged with the sun gear, wherein when the switching member moves toward the transmission position, the planet gear engages with a first intermediate gear to connect the power transmission path, wherein when the switching member moves toward the cut-off position, the planet gear disengages from the first intermediate gear to cut off the power transmission path, and wherein the movement of the switching member towards the transmission position for engaging the planet gear with the first intermediate gear allows the rack to be pulled toward the inner portion of the disc.

6. The disc apparatus of claim 5, further comprising an intermediate member that is engageable with the planet gear, wherein the switching member is moved from the cut-off position to the transmission position based on a rotational force of the planet gear generated when the planet gear is engaged with the intermediate member.

7. The disc apparatus of claim 5, further comprising:

a switch slider operable to move between a first position and a second position, the first position corresponding to unclamping of the disc from the rotator, the second position corresponding to clamping of the disc to the rotator; and a restraining member that moves between a restraining position for restraining the switching member in the transmission position and a restraint-free position for releasing the switching member from the restraining position, wherein the switch slider comprises a restriction segment operable to maintain the restraining member in the restraining position when the switch slider is in the first position or when the switch slider moves from the first position to the second position, the restriction segment operable to allow the restraining member to move to the restraint-free position when the switch slider is shifted to the second position.

8. The disc apparatus of claim 7, wherein the power transmission path comprises a third intermediate gear for transmitting the driving force of the motor to the disc-transferring member, and a switching gear that is movable between an engagement position with the third intermediate gear and a disengagement position from the third intermediate gear, wherein the switch slider further comprises a transmission cam, the transmission cam allowing the switching gear to engage with the third intermediate gear when the switch slider is in the first position to connect the power transmission path for transmitting the driving force of the motor to the disc-transferring member, the transmission cam allowing the switching gear to disengage from the third intermediate gear when the switch slider is shifted from the first position to the second position so as to cut off the power transmission path.

9. The disc apparatus of claim 7, further comprising:

an engagement member that is movable together with the switch slider between the first position and the second position;

a detector that may be moved when pressed by a disc when the disc is transferred to a predetermined position in the casing; and a second pinion gear that is driven by the motor via the sun gear and the planet gear when the switching member is in the transmission position, wherein the engagement member is provided with a first rack and the switch slider is provided with a second rack, and wherein when the engagement member and the switch slider are in the first position and the detector is moved by being pressed by the disc, the detector forces the engagement member to move toward the second position so that the first rack of the engagement member engages with the second pinion gear, the rotational force of the second pinion gear forcing the engagement member to move further such that the switch slider is moved to the second position.

10. A disc apparatus comprising:

a casing having an opening through which a disc is inserted or ejected;

a rotator to a disc may be clamped;

a disc-transferring member operable to transfer the disc between the opening and the rotator;

a head positioned to face a recorded side of a disc clamped to the rotator, the head being movable toward and away from the center of the disc;

a rack with gear teeth that is movable together with the head;

a biasing member disposed between the head and the rack, the biasing member biasing the rack towards the outer periphery of the disc;

a first pinion gear that is engageable with the gear teeth of the rack;

a motor for driving the first pinion gear;

a switching member that moves between a transmission position and a cut-off position, the switching member connecting a power transmission path for transmitting a driving force of the motor to the disc-transferring member when the switching member is in the transmission position, the switching member cutting off the power transmission path when the switching member is in the cut-off position, wherein when the rack moves towards the inner portion of a disc when the disc is not clamped to the rotator, a moving force of the rack allows the switching member to start moving from the cut-off position to the transmission position, the movement of the switching member forcing the rack to move against the biasing force of the biasing member such that the rack is pulled towards the inner portion of the disc, the movement of the rack allowing the gear teeth of the rack to become disengaged from the first pinion gear, thereby connecting the power transmission path for transmitting the driving force of the motor to the disc-transferring member.

11. The disc apparatus of claim 10, further comprising a detector for determining if a disc is transferred to a predetermined position in the casing, wherein, when the detector determines that the disc is transferred to the predetermined position while the driving force of the motor is being transmitted to the disc-transferring member via the power transmission path, the driving force of the motor transmitted through the power transmission path allows the disc to be clamped to the rotator.

12. The disc apparatus of claim 10, further comprising a transmission member disposed between the rack and the switching member, the transmission member operable to transmit the moving force of the rack moving towards the inner portion of the disc to the switching member to move the switching member towards the transmission position.

13. The disc apparatus of claim 12, wherein the switching member comprises a switching cam that engages with the transmission member, and wherein the switching cam restricts the movement of the transmission member when the switching member is in the transmission position to maintain the pulled state of the rack toward the inner portion of the disc and the disengaged state between the gear teeth of the rack and the first pinion gear.

14. The disc apparatus of claim 10, wherein the switching member further comprises a sun gear driven by the motor, and a planet gear engaged with the sun gear, wherein when the switching member moves toward the transmission position, the planet gear engages with a first intermediate gear to connect the power transmission path, wherein when the switching member moves toward the cut-off position, the planet gear disengages from the first intermediate gear to cut off the power transmission path, and wherein the movement of the switching member towards the transmission position for engaging the planet gear with the first intermediate gear allows the rack to be pulled toward the inner portion of the disc.

15. The disc apparatus of claim 14, further comprising an intermediate member that is engageable with the planet gear, wherein the switching member is moved from the cut-off position to the transmission position based on a rotational force of the planet gear generated when the planet gear is engaged with the intermediate member.

16. The disc apparatus of claim 14, further comprising a switch slider operable to move between a first position and a second position, the first position corresponding to unclamping of the disc from the rotator, the second position corresponding to clamping of the disc to the rotator; and a restraining member that moves between a restraining position for restraining the switching member in the transmission position and a restraint-free position for releasing the switching member from the restraining position, wherein the switch slider comprises a restriction segment operable to maintain the restraining member in the restraining position when the switch slider is in the first position or when the switch slider moves from the first position to the second position, the restriction segment operable to allow the restraining member to move to the restraint-free position when the switch slider is shifted to the second position.

17. The disc apparatus of claim 16, wherein the power transmission path comprises a third intermediate gear for transmitting the driving force of the motor to the disc-transferring member, and a switching gear that is movable between an engagement position with the third intermediate gear and a disengagement position from the third intermediate gear, wherein the switch slider further comprises a transmission cam, the transmission cam operable to allow the switching gear to engage with the third intermediate gear when the switch slider is in the first position to connect the power transmission path for transmitting the driving force of the motor to the disc-transferring member, the transmission cam operable to allow the switching gear to disengage from the third intermediate gear when the switch slider is shifted from the first position to the second position to cut off the power transmission path.

18. The disc apparatus of claim 16, further comprising:

an engagement member that is movable together with the switch slider between the first position and the second position;

a detector that is moved by being pressed by the disc when the disc is transferred to a predetermined position in the casing; and a second pinion gear that is driven by the motor via the sun gear and the planet gear when the switching member is in the transmission position, wherein the engagement member is provided with a first rack and the switch slider is provided with a second rack, and wherein, when the engagement member and the switch slider are in the first position and the detector is moved by being pressed by the disc, the detector forces the engagement member to move toward the second position so that the first rack of the engagement member engages with the second pinion gear, the rotational force of the second pinion gear forcing the engagement member to move further such that the switch slider is moved to the second position.

* * * * *